United States Patent
Wang et al.

(10) Patent No.: US 12,425,153 B2
(45) Date of Patent: Sep. 23, 2025

(54) ENHANCED SOUNDING REFERENCE SIGNAL RESOURCE CONFIGURATIONS

(71) Applicant: QUALCOMM INCORPORATED, San Diego, CA (US)

(72) Inventors: Runxin Wang, San Diego, CA (US); Muhammad Sayed Khairy Abdelghaffar, San Jose, CA (US); Yu Zhang, Beijing (CN); Alexandros Manolakos, Escondido, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/758,523

(22) PCT Filed: Feb. 13, 2020

(86) PCT No.: PCT/CN2020/075107
§ 371 (c)(1),
(2) Date: Jul. 8, 2022

(87) PCT Pub. No.: WO2021/159399
PCT Pub. Date: Aug. 19, 2021

(65) Prior Publication Data
US 2023/0030823 A1     Feb. 2, 2023

(51) Int. Cl.
*H04W 4/00*        (2018.01)
*H04L 5/00*        (2006.01)

(52) U.S. Cl.
CPC .................................. *H04L 5/0048* (2013.01)

(58) Field of Classification Search
CPC ..... H04L 5/0048; H04L 48/16; H04L 5/0007; H04L 5/0005; H04L 5/0012
See application file for complete search history.

(56) References Cited

U.S. PATENT DOCUMENTS

| 8,830,931 B2 * | 9/2014 | Chung ................. H04B 7/0684 370/252 |
| 10,367,616 B2 | 7/2019 | Islam et al. |

(Continued)

FOREIGN PATENT DOCUMENTS

| CN | 102595514 A | 7/2012 |
| CN | 105871529 A | 8/2016 |

(Continued)

OTHER PUBLICATIONS

Huawei, et al., "Remaining Issues of Additional SRS Symbols in Normal UL Subframe", 3GPP TSG RAN WG1 Meeting #99, R1-1911916, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 5 Pages, XP051823098, Section 2.2, Figures 2, 3.

(Continued)

*Primary Examiner* — Abdelnabi O Musa
(74) *Attorney, Agent, or Firm* — Paul M. McAdams; Holland & Hart LLP

(57) ABSTRACT

Methods, systems, and devices for wireless communications are described. In some examples, a UE may receive an indication of a set of sounding reference signal (SRS) parameters corresponding to a set of SRS resources for transmitting SRSs, where the set of SRS resources may refer to frequency, or time, or both. In some examples, the SRS parameters may include, among other examples, a frequency allocation, a frequency overlap parameter, a number of allocated symbols, a comb value, a cyclic shift, a comb offset, a frequency hopping parameter, a repetition parameter, a symbol grouping parameter, or any combination thereof. The UE may determine an SRS configuration for the one or more SRSs based on the set of SRS parameters and transmit the one or more SRSs based on the configuration.

(Continued)

In some examples, the SRS configuration includes a configuration for SRS frequency hopping, or SRS repetition, or both.

51 Claims, 18 Drawing Sheets

(56) References Cited

U.S. PATENT DOCUMENTS

| | | | | |
|---|---|---|---|---|
| 11,258,552 | B2* | 2/2022 | Wang | H04L 5/1469 |
| 11,349,543 | B2* | 5/2022 | Zhou | H04B 7/0882 |
| 2010/0067410 | A1* | 3/2010 | He | H04L 5/0048 370/480 |
| 2010/0215114 | A1* | 8/2010 | Kim | H04L 5/0048 375/267 |
| 2012/0057516 | A1* | 3/2012 | Ahn | H04W 72/20 370/312 |
| 2012/0183086 | A1* | 7/2012 | Noh | H04L 27/2605 375/260 |
| 2012/0202558 | A1* | 8/2012 | Hedberg | H04L 5/0048 455/550.1 |
| 2013/0286994 | A1 | 10/2013 | Liu | |
| 2014/0119321 | A1 | 5/2014 | Wang et al. | |
| 2015/0092699 | A1 | 4/2015 | Chen et al. | |
| 2016/0227491 | A1* | 8/2016 | Park | H04W 52/221 |
| 2017/0105201 | A1 | 4/2017 | Nishio et al. | |
| 2018/0020441 | A1* | 1/2018 | Lo | H04W 40/244 |
| 2020/0092059 | A1* | 3/2020 | Zhu | H04L 5/0053 |
| 2020/0366355 | A1* | 11/2020 | Liu | H04B 7/0628 |
| 2021/0075571 | A1* | 3/2021 | Manolakos | H04W 72/23 |
| 2021/0083824 | A1* | 3/2021 | Wernersson | H04L 5/0051 |
| 2021/0185614 | A1* | 6/2021 | Zhou | H04L 5/0096 |
| 2022/0337365 | A1* | 10/2022 | Munier | G01S 5/0236 |
| 2022/0360398 | A1* | 11/2022 | Zhang | H04B 7/063 |
| 2023/0050730 | A1* | 2/2023 | Wang | H04L 5/0048 |

FOREIGN PATENT DOCUMENTS

| | | |
|---|---|---|
| CN | 108111282 A | 6/2018 |
| CN | 109586869 A | 4/2019 |
| WO | 2017176406 | 10/2017 |
| WO | WO-2019068643 A1 | 4/2019 |
| WO | WO-2019192405 A1 | 10/2019 |

OTHER PUBLICATIONS

QUALCOMM Incorporated: "Additional SRS Symbols", 3GPP TSG-RAN WG1 #98, R1-1908840, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, 10 Pages, XP051765448, p. 4, paragraph 4 Figure 2.

QUALCOMM Incorporated: "Additional SRS Symbols", 3GPP TSG-RAN WG1 #98bis, R1-1910731, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14-20, 2019, Oct. 20, 2019, 7 pages, Section 2-7.

Supplementary European Search Report—EP20918582—Search Authority—The Hague—Oct. 12, 2023.

Huawei, et al., "Remaining Issues of Additional SRS Symbols in Normal UL Subframe", 3GPP TSG RAN WG1 Meeting #99, R1-1911916, Reno, USA, Nov. 18-22, 2019, Nov. 9, 2019, 5 Pages.

Huawei, et al., "Summary of Remaining Details of SRS Design," 3GPP TSG RAN WG1 Ad Hoc Meeting, R1-1800090, Jan. 22-26, 2018 (Jan. 26, 2018) Sections 1-4, 12 pages.

International Search Report and Written Opinion—PCT/CN2020/075107—ISA/EPO—Nov. 17, 2020.

3GPP: "3rd Generation Partnership Project, Technical Specification Group Radio Access Network, NR, Physical Channels and Modulation (Release 15)", 3GPP TS 38.211 V15.7.0, Technical Specification, Sep. 28, 2019, pp. 1-97.

3GPP: "3rd Generation Partnership Project, Technical Specification Group Radio Access Network, NR, Physical Layer Procedures for Data (Release 15)", 3GPP TS 38.214 V15.7.0, Technical Specification, Sep. 28, 2019, pp. 1-106.

Huawei, et al., "SRS Design for NR Positioning", 3GPP TSG RAN WG1 Meeting #98bis, R1- 1911343, Chongqing, China, Oct. 14-20, 2019, Oct. 9, 2019, 20 Pages.

3GPP TS 38.211: "3rd Generation Partnership Project, Technical Specification Group Radio Access Network, NR, Physical channels and modulation (Release 15)", V15.8.0, Dec. 2019, pp. 1-93, Section 6.4.1.4.1 (p. 71).

3GPP TS 38.211: "3rd Generation Partnership Project, Technical Specification Group Radio Access Network, NR, Physical channels and modulation (Release 16)", V16.0.0, Dec. 2019, pp. 1-124, Section 6.4.1.4.1 (p. 82).

3GPP TS 38.213: "3rd Generation Partnership Project, Technical Specification Group Radio Access Network, NR, Physical layer procedures for control (Release 16)", V16.0.0, Dec. 2019, pp. 1-146, Section 7.3.1 (p. 28), Section 7.7.3 (p. 37).

3GPP TS 38.214 : "3rd Generation Partnership Project, Technical Specification Group Radio Access Network, NR, Physical layer procedures for data(Release 16)", V16.0.0, Dec. 2019, pp. 1-147, Section 6.2.1 (pp. 124-125).

3GPP TS 38.331: "3rd Generation Partnership Project, Technical Specification Group Radio Access Network, NR, Radio Resource Control (RRC) protocol specification (Release 15)", V15.8.0, Dec. 2019, pp. 1-529, Section 6.3.2 (pp. 378-382).

* cited by examiner

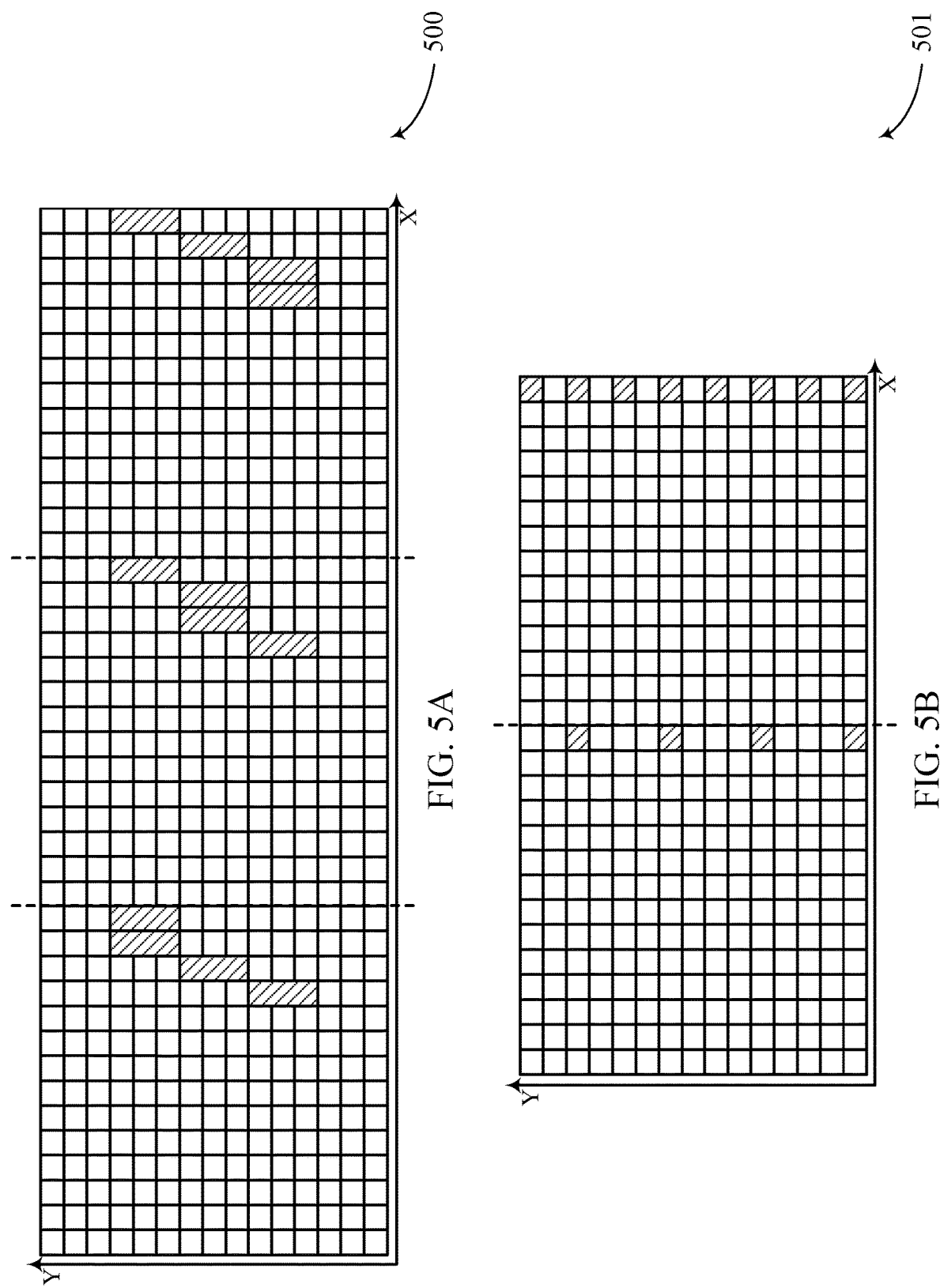

ENHANCED SOUNDING REFERENCE SIGNAL RESOURCE CONFIGURATIONS

CROSS REFERENCE

The present Application is a 371 national stage filing of International PCT Application No. PCT/CN2020/075107 by WANG et al. entitled "ENHANCED SOUNDING REFERENCE SIGNAL RESOURCE CONFIGURATIONS," filed Feb. 13, 2020, which is assigned to the assignee hereof, and which is expressly incorporated by reference in its entirety herein.

FIELD OF TECHNOLOGY

The following relates generally to wireless communications and more specifically to enhanced sounding reference signal (SRS) resource configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support enhanced sounding reference signal (SRS) resource configurations. Generally the described techniques facilitate enhanced SRS configurations to improve SRS flexibility and increase the efficiency of SRS resource utilization. In some examples, a UE may receive, from a base station, an indication of a set of SRS parameters corresponding to a set of SRS resources for transmitting one or more SRSs, where the set of SRS resources may refer to frequency (e.g., a physical resource block (PRB) index, a subcarrier index) or time (e.g., orthogonal frequency division multiplexing (OFDM) symbol index), or both. In some examples, the SRS parameters may include a frequency allocation, a frequency overlap parameter, a number of allocated symbols, a comb value, a cyclic shift, a cyclic offset shift, a comb offset, a frequency hopping parameter, a repetition parameter, a symbol grouping parameter, or any combination thereof. The UE may determine an SRS configuration for the one or more SRSs based on one or more of the set of SRS parameters. In some examples, the SRS configuration may include a configuration for SRS frequency hopping, or SRS repetition, or both. The UE may transmit one or more of the one or more SRSs to the base station based on the SRS configuration.

A method of wireless communications at a UE is described. The method may include receiving, from a base station, an indication of a set of SRS parameters corresponding to a set of SRS resources for transmitting one or more SRSs, determining a SRS configuration for the one or more SRSs based on the set of SRS parameters, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof, and transmitting the one or more SRSs to the base station based on the SRS configuration.

An apparatus for wireless communications at a UE is described. The apparatus may include a processor, memory coupled with the processor, and instructions stored in the memory. The instructions may be executable by the processor to cause the apparatus to receive, from a base station, an indication of a set of SRS parameters corresponding to a set of SRS resources for transmitting one or more SRSs, determine a SRS configuration for the one or more SRSs based on the set of SRS parameters, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof, and transmit the one or more SRSs to the base station based on the SRS configuration.

Another apparatus for wireless communications at a UE is described. The apparatus may include means for receiving, from a base station, an indication of a set of SRS parameters corresponding to a set of SRS resources for transmitting one or more SRSs, determining a SRS configuration for the one or more SRSs based on the set of SRS parameters, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof, and transmitting the one or more SRSs to the base station based on the SRS configuration.

A non-transitory computer-readable medium storing code for wireless communications at a UE is described. The code may include instructions executable by a processor to receive, from a base station, an indication of a set of SRS parameters corresponding to a set of SRS resources for transmitting one or more SRSs, determine a SRS configuration for the one or more SRSs based on the set of SRS parameters, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof, and transmit the one or more SRSs to the base station based on the SRS configuration.

In some examples of the method, apparatuses, and non-transitory computer-readable medium described herein, receiving the indication of the set of SRS parameters may include operations, features, means, or instructions for receiving an indication of the number of symbols for which the SRS is configured, the number of symbols being greater than four symbols.

In some examples of the method, apparatuses, and non-transitory computer-readable medium described herein, receiving the indication of the set of SRS parameters may include operations, features, means, or instructions for receiving an indication of the number of symbols for which the SRS is configured, the number of symbols being up to fourteen symbols.

In some examples of the method, apparatuses, and non-transitory computer-readable medium described herein, determining the SRS configuration may include operations, features, means, or instructions for determining that each of one or more antenna ports for the SRS resource may be mapped to a single set of subcarriers across one or more pairs of the symbols of the SRS resource.

Some examples of the method, apparatuses, and non-transitory computer-readable medium described herein may further include operations, features, means, or instructions for determining that the SRS configuration may be unsupported based on determining that each of the one or more antenna ports of for the SRS resource may be mapped to the single set of subcarriers across the one or more pairs of the symbols of the SRS resource, where transmitting the one or more SRSs to the base station may be based on determining that the SRS configuration may be unsupported.

In some examples of the method, apparatuses, and non-transitory computer-readable medium described herein, determining the SRS configuration may include operations, features, means, or instructions for determining the non-uniform grouping for the one or more SRSs based on determining that each of the one or more antenna ports of for the SRS resource may be mapped to the single set of subcarriers across the one or more pairs of the symbols of the SRS resource, where transmitting the one or more SRSs to the base station may be based on determining the non-uniform grouping for the one or more SRSs.

In some examples of the method, apparatuses, and non-transitory computer-readable medium described herein, receiving the indication of the set of SRS parameters may include operations, features, means, or instructions for receiving an indication of the non-uniform grouping for the one or more SRSs for a SRS resource of the set of SRS resources or of a second set of SRS resources, and where determining the SRS configuration includes determining the non-uniform grouping for the one or more SRSs based on receiving the indication of the non-uniform grouping.

In some examples of the method, apparatuses, and non-transitory computer-readable medium described herein, determining the non-uniform grouping may include operations, features, means, or instructions for determining that the one or more SRSs may be each mapped to a different set of subcarriers across different symbols of the SRS resource.

In some examples of the method, apparatuses, and non-transitory computer-readable medium described herein, determining the non-uniform grouping may include operations, features, means, or instructions for determining that one of the one or more SRSs may be repeated on a same set of subcarriers across contiguous symbols of the SRS resource, and determining that one of the one or more SRSs may be not repeated on a same set of subcarriers across contiguous symbols of the SRS resource.

In some examples of the method, apparatuses, and non-transitory computer-readable medium described herein, determining the non-uniform grouping may include operations, features, means, or instructions for determining that one of the one or more SRSs may be transmitted on a first group of subcarriers on at least a first symbol of the SRS resource, and determining that one of the one or more SRSs may be transmitted on a second group of subcarriers on at least a second symbol of the SRS resource.

In some examples of the method, apparatuses, and non-transitory computer-readable medium described herein, determining the SRS configuration may include operations, features, means, or instructions for setting a number of frequency hops for at least one of the one or more SRSs, or setting a number of symbols of each frequency hop for at least one of the one or more SRSs, or both.

In some examples of the method, apparatuses, and non-transitory computer-readable medium described herein, receiving the indication of the set of SRS parameters may include operations, features, means, or instructions for receiving an indication of a comb value for one or more symbols of a SRS resource of the set of SRS resources, and where determining the SRS configuration includes setting a first comb value for a first symbol of the one or more symbols of the SRS resource and setting a second comb value for a second symbol of the one or more symbols of the SRS resource.

In some examples of the method, apparatuses, and non-transitory computer-readable medium described herein, receiving the indication of the set of SRS parameters may include operations, features, means, or instructions for receiving an indication of a cyclic shift value or a cyclic shift offset for one or more symbols of a SRS resource of the set of SRS resources, and where determining the SRS configuration includes setting a first cyclic shift value or a first cyclic shift offset for a first symbol of the one or more symbols of the SRS resource and setting a second cyclic shift value or a second cyclic shift offset for a second symbol of the one or more symbols of the SRS resource.

In some examples of the method, apparatuses, and non-transitory computer-readable medium described herein, receiving the indication of the set of SRS parameters may include operations, features, means, or instructions for receiving an indication of a comb offset value for one or more symbols of a SRS resource of the set of SRS resources, and where determining the SRS configuration includes setting a first comb offset value for a first symbol of the one or more symbols of the SRS resource and setting a second comb offset value for a second symbol of the one or more symbols of the SRS resource.

In some examples of the method, apparatuses, and non-transitory computer-readable medium described herein, receiving the indication of the set of SRS parameters may include operations, features, means, or instructions for receiving an indication that partial frequency overlapping for symbols of a SRS resource of the set of SRS resources may be configured, and where determining the SRS configuration includes setting a first set of subcarriers for a first symbol of the set of SRS resources and a second set of subcarriers for a second symbol of the set of SRS resources, the first set of subcarriers at least partially overlapping with the second set of subcarriers.

In some examples of the method, apparatuses, and non-transitory computer-readable medium described herein, determining the SRS configuration may include operations, features, means, or instructions for setting a third set of subcarriers for a third symbol of the set of SRS resources, the third set of subcarriers at least partially overlapping with the second set of subcarriers a same amount as the first set of subcarriers at least partially overlap with the second set of subcarriers.

In some examples of the method, apparatuses, and non-transitory computer-readable medium described herein, determining the SRS configuration may include operations, features, means, or instructions for setting a third set of subcarriers for a third symbol of the set of SRS resources, the third set of subcarriers at least partially overlapping with the second set of subcarriers a different amount as the first set of subcarriers at least partially overlap with the second set of subcarriers.

In some examples of the method, apparatuses, and non-transitory computer-readable medium described herein, determining the SRS configuration may include operations, features, means, or instructions for setting a third set of subcarriers for a third symbol of the set of SRS resources and a fourth set of subcarriers for a fourth symbol of the set of SRS resources, the fourth set of subcarriers at least partially overlapping with the third set of subcarriers a same amount as the first set of subcarriers at least partially overlap with the second set of subcarriers.

In some examples of the method, apparatuses, and non-transitory computer-readable medium described herein, determining the SRS configuration may include operations, features, means, or instructions for setting a third set of subcarriers for a third symbol of the set of SRS resources and a fourth set of subcarriers for a fourth symbol of the set of SRS resources, the fourth set of subcarriers at least partially overlapping with the third set of subcarriers a different amount as the first set of subcarriers at least partially overlap with the second set of subcarriers.

In some examples of the method, apparatuses, and non-transitory computer-readable medium described herein, determining the SRS configuration may include operations, features, means, or instructions for setting a third set of subcarriers for a third symbol of the set of SRS resources and a fourth set of subcarriers for a fourth symbol of the set of SRS resources, the fourth set of subcarriers not overlapping with the third set of sub carriers.

In some examples of the method, apparatuses, and non-transitory computer-readable medium described herein, determining the SRS configuration may include operations, features, means, or instructions for determining a first SRS configuration for a first subset of a slot and determining a second SRS configuration for a subset of the slot, and where the SRSs include one or more of a periodic SRS or a semi-persistent SRS.

In some examples of the method, apparatuses, and non-transitory computer-readable medium described herein, determining the first SRS configuration and the second SRS configuration may include operations, features, means, or instructions for determining one or more SRS parameters of the set of SRS parameters for the first SRS configuration that may be different than one or more SRS parameters of the set of SRS parameters for the second SRS configuration based on a frame index, a slot index, a periodic timing, a defined order, or any combination thereof.

In some examples of the method, apparatuses, and non-transitory computer-readable medium described herein, the SRS configuration may include operations, features, means, or instructions for a configuration for the periodic SRS or the semi-persistent SRS.

In some examples of the method, apparatuses, and non-transitory computer-readable medium described herein, the set of SRS parameters may include operations, features, means, or instructions for a frequency allocation, a comb value, a cyclic shift, a cyclic shift offset, a comb offset, a frequency hopping parameter, a repetition parameter, a symbol grouping parameter, or any combination thereof.

In some examples of the method, apparatuses, and non-transitory computer-readable medium described herein, receiving the indication of the set of SRS parameters may include operations, features, means, or instructions for receiving an indication of a symbol grouping parameter indicating one or more of a number of frequency hops or a number of symbols per frequency hop for the SRS configuration.

In some examples of the method, apparatuses, and non-transitory computer-readable medium described herein, receiving the indication of the set of SRS parameters further may include operations, features, means, or instructions for receiving radio resource control (RRC) signaling including the indication of the set of SRS parameters.

In some examples of the method, apparatuses, and non-transitory computer-readable medium described herein, receiving the indication of the set of SRS parameters further may include operations, features, means, or instructions for receiving downlink control information (DCI) or a medium access control control element (MAC-CE) including the indication of the set of SRS parameters.

In some examples of the method, apparatuses, and non-transitory computer-readable medium described herein, determining the SRS configuration may include operations, features, means, or instructions for selecting a defined configuration based on receiving the DCI or the MAC-CE, or setting one or more SRS parameters of the set of SRS parameters for the SRS configuration based on receiving the DCI or the MAC-CE.

Some examples of the method, apparatuses, and non-transitory computer-readable medium described herein may further include operations, features, means, or instructions for receiving DCI or a MAC-CE including an indication of a second set of SRS parameters, updating the SRS configuration for the one or more SRSs based on the second set of SRS parameters, and transmitting the one or more SRSs to the base station based on the updated SRS configuration.

A method of wireless communications at a base station is described. The method may include determining a set of SRS resources for transmitting one or more SRSs from a UE and a set of SRS parameters corresponding to the set of SRS resources, transmitting, to the UE, an indication of the set of SRS parameters corresponding to the set of SRS resources for transmitting one or more SRSs from the UE, and receiving the one or more SRSs from the UE based on a SRS configuration, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof.

An apparatus for wireless communications at a base station is described. The apparatus may include a processor, memory coupled with the processor, and instructions stored in the memory. The instructions may be executable by the processor to cause the apparatus to determine a set of SRS resources for transmitting one or more SRSs from a UE and a set of SRS parameters corresponding to the set of SRS resources, transmit, to the UE, an indication of the set of SRS parameters corresponding to the set of SRS resources for transmitting one or more SRSs from the UE, and receive the one or more SRSs from the UE based on a SRS configuration, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof.

Another apparatus for wireless communications at a base station is described. The apparatus may include means for determining a set of SRS resources for transmitting one or more SRSs from a UE and a set of SRS parameters corresponding to the set of SRS resources, transmitting, to the UE, an indication of the set of SRS parameters corresponding to the set of SRS resources for transmitting one or more SRSs from the UE, and receiving the one or more SRSs from the UE based on a SRS configuration, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof.

A non-transitory computer-readable medium storing code for wireless communications at a base station is described. The code may include instructions executable by a processor to determine a set of SRS resources for transmitting one or more SRSs from a UE and a set of SRS parameters corresponding to the set of SRS resources, transmit, to the UE, an indication of the set of SRS parameters corresponding to the set of SRS resources for transmitting one or more SRSs from the UE, and receive the one or more SRSs from the UE based on a SRS configuration, where the SRS configuration includes a configuration for a number of symbols for which the SRS is configured, a non-uniform grouping for at least one of the one or more SRSs, different SRS parameters for at least one SRS resource, a partial frequency overlapping for symbols of a SRS resource, different SRS configurations for different subsets of a slot, or a dynamic configuration for at least some of the SRS parameters, or any combination thereof.

In some examples of the method, apparatuses, and non-transitory computer-readable medium described herein, transmitting the indication of the set of SRS parameters may include operations, features, means, or instructions for transmitting an indication of the number of symbols for which the SRS is configured, the number of symbols being greater than four symbols.

In some examples of the method, apparatuses, and non-transitory computer-readable medium described herein, transmitting the indication of the set of SRS parameters may include operations, features, means, or instructions for transmitting an indication of the number of symbols for which the SRS is configured, the number of symbols being up to fourteen symbols.

In some examples of the method, apparatuses, and non-transitory computer-readable medium described herein, transmitting the indication of the set of SRS parameters may include operations, features, means, or instructions for transmitting an indication of the non-uniform grouping for the one or more SRSs for a SRS resource of the set of SRS resources or of a second set of SRS resources.

In some examples of the method, apparatuses, and non-transitory computer-readable medium described herein, transmitting the indication of the set of SRS parameters may include operations, features, means, or instructions for transmitting an indication of a comb value for one or more symbols of a SRS resource of the set of SRS resources.

In some examples of the method, apparatuses, and non-transitory computer-readable medium described herein, transmitting the indication of the set of SRS parameters may include operations, features, means, or instructions for transmitting an indication of a cyclic shift value or a cyclic shift offset for one or more symbols of a SRS resource of the set of SRS resources.

In some examples of the method, apparatuses, and non-transitory computer-readable medium described herein, transmitting the indication of the set of SRS parameters may include operations, features, means, or instructions for transmitting an indication of a comb offset value for one or more symbols of a SRS resource of the set of SRS resources.

In some examples of the method, apparatuses, and non-transitory computer-readable medium described herein, transmitting the indication of the set of SRS parameters may include operations, features, means, or instructions for transmitting an indication that partial frequency overlapping for symbols of a SRS resource of the set of SRS resources may be configured.

In some examples of the method, apparatuses, and non-transitory computer-readable medium described herein, a frequency allocation, a comb value, a cyclic shift, a cyclic shift offset, a comb offset, a frequency hopping parameter, a repetition parameter, a symbol grouping parameter, or any combination thereof.

In some examples of the method, apparatuses, and non-transitory computer-readable medium described herein, transmitting the indication of the set of SRS parameters may include operations, features, means, or instructions for transmitting an indication of a symbol grouping parameter indicating one or more of a number of frequency hops or a number of symbols per frequency hop for the SRS configuration.

In some examples of the method, apparatuses, and non-transitory computer-readable medium described herein, transmitting the indication of the set of SRS parameters further may include operations, features, means, or instructions for transmitting RRC signaling including the indication of the set of SRS parameters.

In some examples of the method, apparatuses, and non-transitory computer-readable medium described herein, transmitting the indication of the set of SRS parameters further may include operations, features, means, or instructions for transmitting DCI or a MAC-CE including the indication of the set of SRS parameters.

Some examples of the method, apparatuses, and non-transitory computer-readable medium described herein may further include operations, features, means, or instructions for transmitting downlink control information or a MAC-CE including an indication of a second set of SRS parameters, and receiving the one or more SRSs to the base station based on the updated SRS configuration.

BRIEF DESCRIPTION OF THE DRAWINGS

FIGS. 3A through 5B illustrate examples of SRS resource configurations that support enhanced SRS resource configurations in accordance with aspects of the present disclosure.

DETAILED DESCRIPTION

Figure 1:
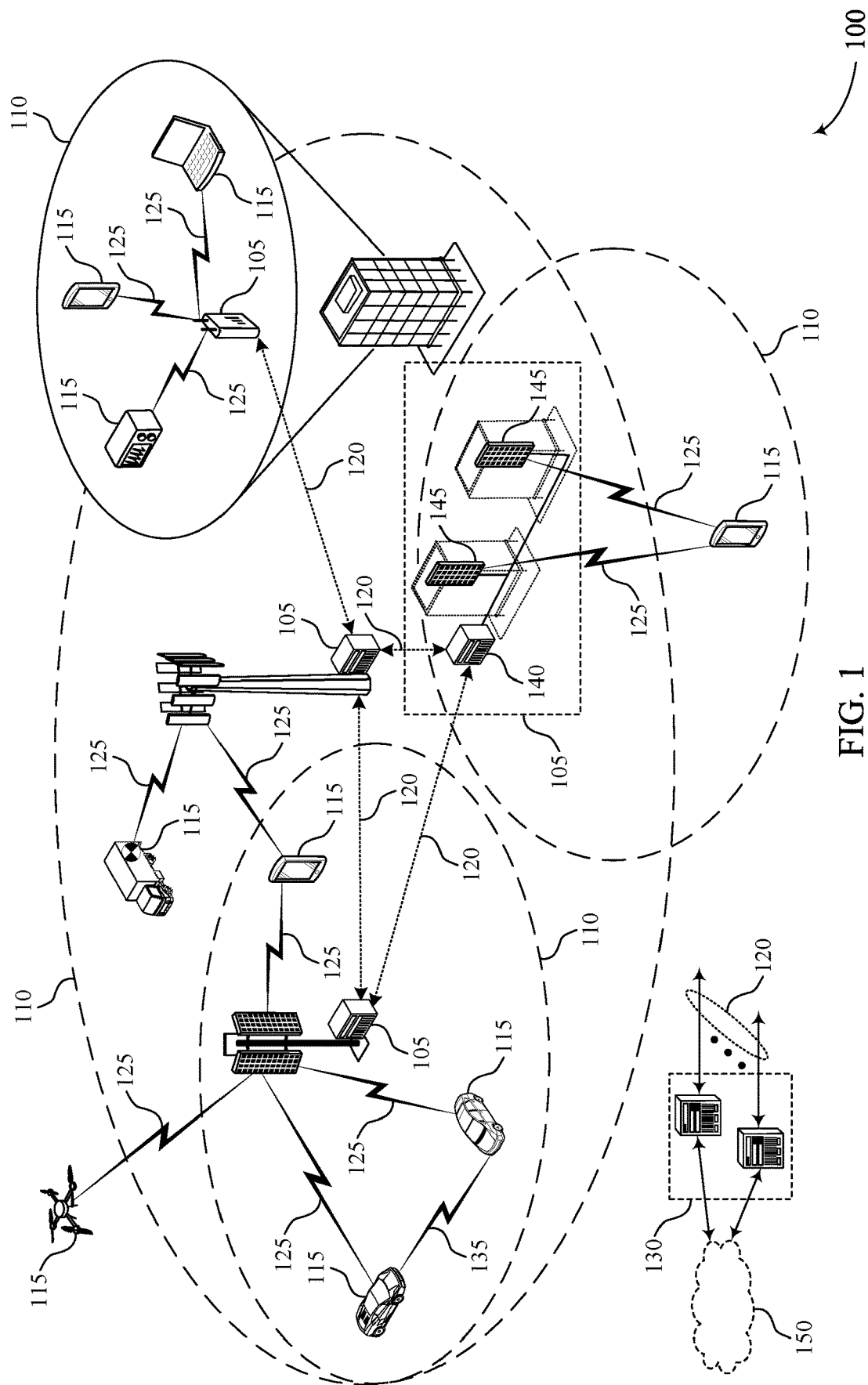
FIG. 1 illustrates an example of a system for wireless communications that supports enhanced sounding reference signal (SRS) resource configurations in accordance with aspects of the present disclosure.

A user equipment (UE) in a wireless communications system may communicate with other wireless devices, such as a base station. The base station may configure resources to be used for communications with the UE. In some examples, the UE may have multiple antennas, and may transmit reference signals according to an antenna switching process to provide channel estimation for one or more of the antennas. The reference signal resource used to transmit reference signals may be transmitted aperiodically (e.g., via downlink control information (DCI) signaling), semi-persistently, or periodically. The UE may then select one or more antennas for communications or the base station may determine one or more communication beams based on the channel estimation.

As such, a UE may transmit a reference signal, such as a sounding reference signal (SRS) to a base station. In some examples, a base station may configure one or more reference signal resources for a set of symbols (e.g., one or more symbols), one or more subcarriers, one or more ports or antennas, etc., where an SRS resource set may contain one or more resources for use by the UE to transmit SRSs.

The UE may be configured by the base station with one or more resources, which may be grouped in a reference signal resource set depending on an application. The applications may include, among other examples, antenna switching, codebook-based communications, non-codebook-based communications, or beam management, or any combination thereof.

In some other example configurations, a base station may configure one or more SRS resources such that the SRS resources may span one or more (e.g., 1, 2, 4) consecutive or non-consecutive symbols, with up to 4 ports per reference signal resource. In some examples, each port of a reference signal resource may be sounded in each symbol. In some wireless communications systems, an SRS may only be transmitted in the last 6 symbols of a slot and may only be transmitted after a physical uplink channel (PUSCH) transmission in the slot. In some implementations, SRS resources transmitted under such configurations may result in an inefficient use of resources and may be subject to rigid constraints based on prior limitations for SRS transmissions.

In line with the present disclosure, to more effectively utilize SRS resources and increase SRS flexibility, a base station may transmit a set of SRS parameters (e.g., one or more) to a UE that the UE may use in determining an SRS transmission configuration that the UE should use to transmit SRSs to the base station. In some examples, the set of parameters may include an indication that UE may be configured to support SRS frequency hopping and repetitions for greater than 4 symbols and up to 14 symbols. Additionally or alternatively, a UE may be configured to support non-uniform grouping for SRS frequency hopping and repetition. Additionally or alternatively, the UE may be configured to support different comb values, cyclic shift values, comb offset values, or cyclic shift offset values, among other values, for SRS resources. Additionally or alternatively, the UE may be configured to support partial frequency overlap between symbols of different frequency hops in one or more SRS resources. In some examples, the frequency overlap between one set of symbols (e.g., one or more symbols) may be the same or different than the frequency overlap between another set of symbols (e.g., one or more symbols). Additionally or alternatively, the UE may be configured to support different parameter assignments across slots. Additionally or alternatively, the UE may be configured to receive the SRS resource parameters via radio resource control (RRC) signaling, signaling including DCI, or signaling related to a medium access control control element (MAC-CE). In some examples, the UE may be configured to receive a first SRS configuration via RRC signaling and receiving a second set (e.g., an updated set) of SRS parameters via DCI or a MAC-CE. In some examples, the UE may receive the first SRS configuration via DCI or a MAC-CE. As used herein, a set may include one or more elements in the set unless otherwise noted.

Particular aspects of the subject matter described herein may be implemented to realize one or more advantages. The described techniques may support improvements in the SRS transmission framework by increasing SRS resource configuration flexibility, and increasing SRS resource utilization, among other advantages. As such, supported techniques may include improved network operations and, in some examples, may promote network efficiencies, among various other benefits.

Aspects of the disclosure are initially described in the context of wireless communications systems. Aspects are then described with reference to SRS resource configurations and a process flow. Aspects of the disclosure are further illustrated by and described with reference to apparatus diagrams, system diagrams, and flowcharts that relate to enhanced SRS resource configurations.

FIG. 1 illustrates an example of a wireless communications system 100 that supports enhanced SRS resource configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE may receive, from a base station, an indication of a set of SRS parameters corresponding to a set of SRS resources for transmitting one or more SRSs, where the set of SRS resources may refer to frequency (e.g., a physical resource block (PRB) index, or subcarrier index) or time (e.g., orthogonal frequency division multiplexing (OFDM) symbol index), or both. In some examples, the SRS parameters may include, among other examples, a frequency allocation, a frequency overlap parameter, a number of allocated symbols, a comb value, a cyclic shift, a comb offset, a frequency hopping parameter, a repetition parameter, a symbol grouping parameter, or any combination thereof. The UE may determine one or more SRS configurations for the one or more SRSs based on the set of SRS parameters. In some examples, the one or more SRS configurations may include, among other examples, a configuration for SRS frequency hopping, or SRS repetition, or both. The UE may transmit at least some of the one or more SRSs to the base station based on the SRS configuration.

Figure 2:
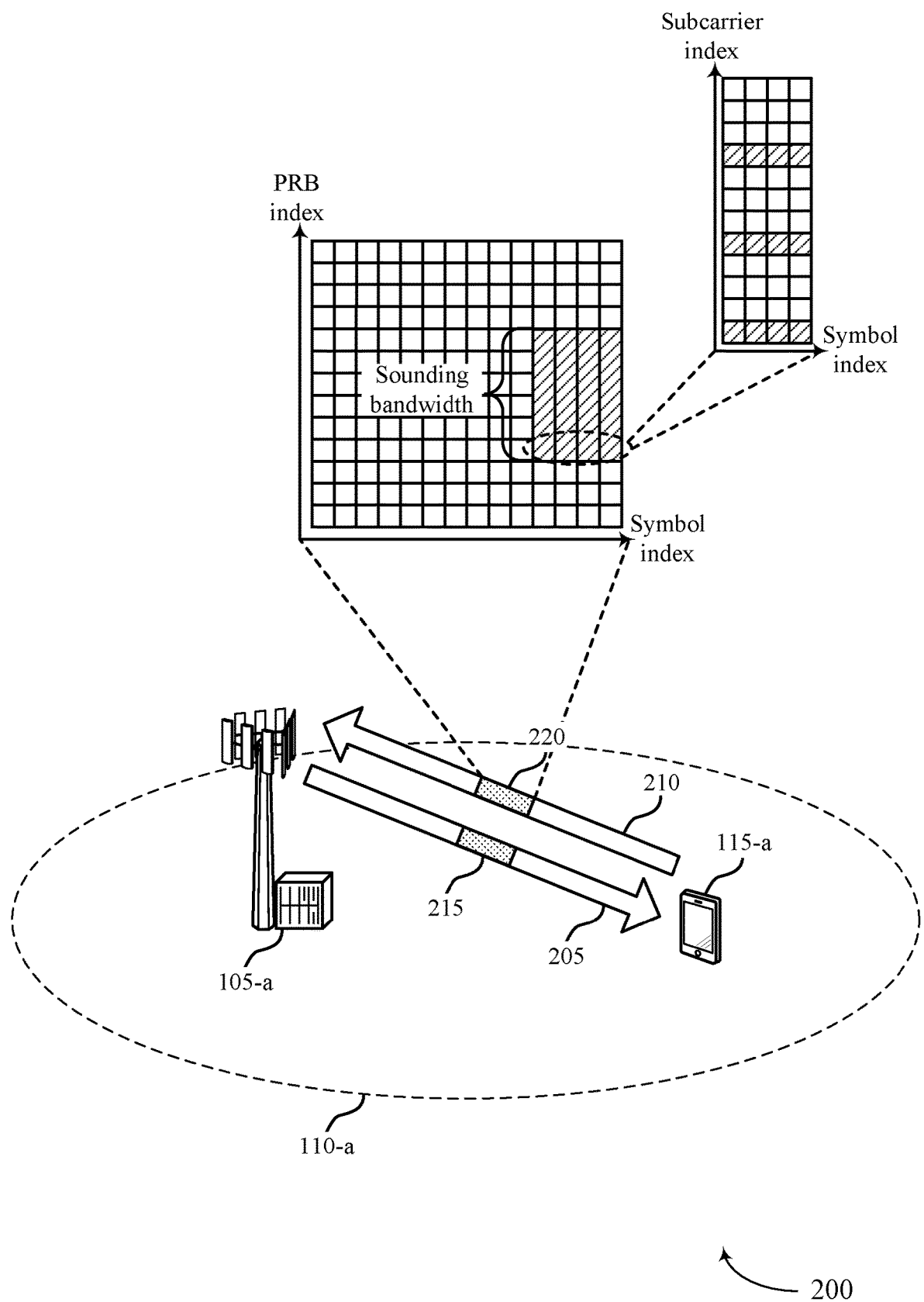
FIG. 2 illustrates an example of a system for wireless communications that supports enhanced SRS resource configurations in accordance with aspects of the present disclosure.

FIG. 2 illustrates an example of a wireless communications system 200 that supports enhanced SRS resource configurations in accordance with aspects of the present disclosure. The wireless communications system 200 may include a base station 105-a and a UE 115-a, which may be examples of a base station 105 and UE 115 as described with reference to FIG. 1. Base station 105-a may serve a geographic coverage area 110-a. In some examples, base station 105-a may implement enhanced SRS resource configurations. For example, base station 105-a may transmit a set of SRS parameters to a UE 115 that the UE 115 may use to determine one or more SRS transmission configurations. Additionally or alternatively, other wireless devices, such as UE 115-a, may implement the enhanced SRS resource configurations. The examples described herein do not include an exhaustive list. More examples may be possible. Any of the examples described with reference to FIGS. 2 through 6 may be used in any combination with each other.

Before transmitting one or more SRSs, a UE 115 may receive a set of parameters associated with a set of SRS resources from the base station 105. For example, UE 115-a may receive one or more SRS parameter messages 215 (e.g., RRC signaling) via downlink signal 205 that may indicate a set of SRS parameters. In some examples, a UE 115 may be configured with one or more (e.g., multiple_SRS resources grouped in an SRS resource set depending on an application (e.g., antenna switching, codebook-based communications, non-codebook based communications, beam management). For example, a UE 115 may be configured with multiple SRS resource sets, that may each including one or more resources, where one of the sets may be configured for antenna switching, and another set may be configured for codebook-based SRSs. The resources a UE 115 is configured with may refer to time and frequency resources, such as a PRB index, subcarrier index, symbol index (e.g., OFDM symbol index), etc.

Based on receiving the SRS parameters, UE 115-a may determine one or more SRS configurations for one or more SRS transmissions. In some examples, the one or more SRS transmissions may include multiple SRS transmissions in one or more of multiple symbols, multiple PRBs, multiple subcarriers, etc.

In some other implementations, UE 115-a may be constrained to transmit SRSs in 1, 2, or 4 adjacent symbols, the SRSs may be constrained to the last 6 symbols of a slot, and may only be transmitted after the PUSCH of the slot is transmitted. For example, UE 115-a may transmit SRS transmission 220 via uplink signaling 210 to base station 105-a. In the example resource grid depicted in FIG. 2, where the y axis is the PRB index and the x axis is the symbol index, UE 115-a may transmit the SRS transmission using a block of resources in the sounding bandwidth and a number of symbols (e.g., the last four symbols) of the slot. The sounding bandwidth may include 48 PRBs in some examples. A PRB may be divided into smaller units such as a subcarrier, where 1 PRB may be associated with one or more subcarriers, such as 12 subcarriers. As such, UE 115-*a* may configure SRS resources on the subcarrier level as depicted in the grid with the subcarrier index and symbol index axis for SRS transmission.

For example, UE 115-*a* may configure the SRS transmissions in some symbols (e.g., the last four symbols) of the slot with frequency hopping and repetition supported for up to four symbols, with equal SRS repetition grouping, with a similar comb value across SRS transmissions in a pair, with a similar cyclic shift across SRS transmissions in a pair, and with no frequency overlap. UE 115-*a* may configure the SRS transmissions the same for each slot. For example, as depicted in FIG. 2, UE 115-*a* may transmit repeated SRS transmissions with a comb value of 4, and a repetition factor of 4 where each SRS transmission in an adjacent symbol in the same subcarrier (e.g., each of the four repeated SRS transmissions) may have the same comb value and the same offset value.

To more effectively utilize SRS resources and increase SRS flexibility, a base station 105 may configure a UE to support more flexible SRS configurations and parameters. As such base station 105-*a* may transmit an indication of a set of parameters (e.g., one or more bit values, one or more fields including an indication, information associated with an index or value stored at the UE that points to one or more SRS parameters), the set of parameters themselves, or both) to UE 115-*a*. In some examples, the set of parameters may include an indication that UE 115-*a* may be configured to support SRS frequency hopping and repetitions for a number of symbols, such as greater than 4 symbols, or up to 14 symbols, or both. Repetitions may refer to more than one of the same SRS being transmitted in one or more symbols (e.g., adjacent symbols). Frequency hopping may refer to a UE 115 using different parts of a subcarrier to transmit SRS signals, for example, in different symbols. In some examples, the number of symbols that may be used for SRS frequency hopping and repetitions may be 1 or may be an even number, such as 2, 4, 6, 8, 10, 12, or 14. The following example table, Table 1, may indicate the configurations that are possible for up to 14 symbols.

TABLE 1

Supported SRS Resource Configurations

| For one SRS resource | | Number of symbols, Ns | | | | | | | |
|---|---|---|---|---|---|---|---|---|---|
| | | 1 | 2 | 4 | 6 | 8 | 10 | 12 | 14 |
| Number of repetitions, R | 1 | Yes | Yes | Yes | Yes | Yes | Yes | Yes | Yes |
| | 2 | — | Yes | Yes | Yes | Yes | Yes | Yes | Yes |
| | 4 | — | — | Yes | Other | Yes | Other | Yes | Other |
| | 6 | — | — | — | Yes | Other | Other | Yes | Other |
| | 8 | — | — | — | — | Yes | Other | Other | Other |
| | 10 | — | — | — | — | — | Yes | Other | Other |
| | 12 | — | — | — | — | — | — | Yes | Other |
| | 14 | — | — | — | — | — | — | — | Yes |

For an SRS resource with one or more symbols (e.g., Ns symbols), frequency hopping may be configured for one or more repetitions (e.g., R repetitions), where intra-slot hopping, or inter-slot hopping, or both may be supported for at least some (if not each) of the antenna ports of the SRS resource that may be mapped to one or more different sets of subcarriers across one or more pairs (e.g., Ns/R pairs) of R adjacent symbols (e.g., OFDM symbols) of the resource, for example, in each slot. In some examples, at least some, if not each, of the antenna ports of the SRS resource may be mapped to a same set of subcarriers, for example, within each pair of R adjacent symbols of the resource in each slot. In some examples, where the number of symbols divided by the number of repetitions does not equal a full number (e.g., 6 symbols divided by 4 repetitions is 1.5), another option may support the configuration. In some examples, UE 115-*a* may be configured to support non-uniform grouping for SRS frequency hopping and repetitions. In some examples, non-uniform grouping may be supported by the configurations in the table labeled "other."

Additionally or alternatively, UE 115-*a* may be configured to support, among other examples, different comb values, different cyclic shift values, different comb offset values, or different cyclic shift offset values for one or more SRS resources. Additionally or alternatively, UE 115-*a* may be configured to support partial frequency overlap between symbols of different frequency hops. Additionally or alternatively, UE 115-*a* may be configured to support different parameter assignments across slots. Additionally or alternatively, UE 115-*a* may be configured to receive the SRS resource parameters via signaling, such as RRC signaling, signaling including DCI, or signaling related to a MAC-CE. In some examples, UE 115-*a* may be configured to receive a first (e.g., original) SRS configuration via RRC signaling and receiving a second (e.g., updated) set of SRS parameters via DCI or a MAC-CE. In some examples, UE 115-*a* may receive the first SRS configuration via DCI or a MAC-CE.

FIGS. 3A, 3B, 3C, and 3D illustrate examples of SRS resource configurations 300, 301, 302, and 303 that support enhanced SRS resource configurations in accordance with aspects of the present disclosure. The SRS resource configurations 300, 301, 302, and 302 may be configured by a base station or a UE, which may be examples of a base station and UE as described with reference to FIGS. 1 and 2. The x axis may be time resources (e.g., OFDM symbols) and the y axis may be frequency resources (e.g., subcarriers). In some examples, a base station may implement enhanced SRS resource configurations. For example, a base station may transmit a set of SRS parameters to a UE that the UE may use to determine one or more SRS transmission configurations. Additionally or alternatively, other wireless devices, such as the UE, may implement the enhanced SRS resource configurations. The examples described herein do not include an exhaustive list. More examples may be possible. Any of the examples described with reference to FIGS. 2 through 6 may be used in any combination with each other.

In some examples, to effectively utilize SRS resources, a UE may be configured to support non-uniform grouping for SRS frequency hopping and repetitions. For example, an SRS resource with one or more symbols, such as Ns symbols, (e.g., 1, 2, 4, 6, 8, 10, 12, 14 symbols) where frequency hopping is configured, an SRS may be mapped to different sets of subcarriers across $R_i$ adjacent symbols for each hop, where i=0, 1, ... M, and M may be the number of hops (e.g., frequency hops). In some examples, within the $R_i$ adjacent symbols, each of the antenna ports of the SRS resource may be mapped to a same set of subcarriers. In some examples, the base station or the UE may configure the number of hops, or the number of adjacent symbols (e.g., OFDM symbols), or both for each hop. For example, UE may configure the SRS resources where the number of SRS repetitions per subcarrier may be different, such that a first subcarrier may be configured with a single SRS transmission, a second subcarrier may be configured with a pair of repeated SRS transmissions, and a third subcarrier may be configured with a single SRS transmission, etc.

In some examples, a UE may be configured to transmit one or more SRS signals in one or more symbols (e.g., four SRS signals in four adjacent symbols). The UE may be configured to transmit the SRS signals with a frequency hop of 3 and 2 of the 4 SRS signals may be repeated versions.

Figure 3A:
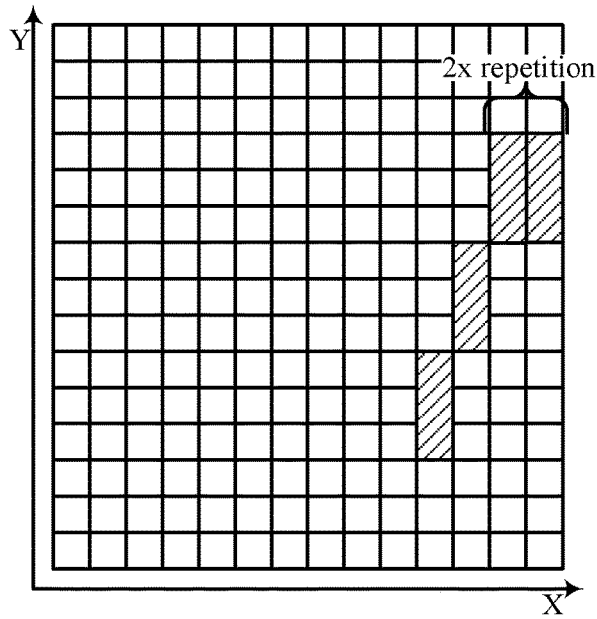

In some examples, the UE may be configured to transmit the SRS signals according to symbol grouping parameter, 1/1/2. For example, the UE may configure the SRS transmission as depicted in FIG. 3A such that the first SRS signal of the first hop is a single SRS signal, the second SRS signal of the second hop is a single SRS signal, and the third and fourth SRS signals of the third hop are repeated SRS signals.

Figure 3B:
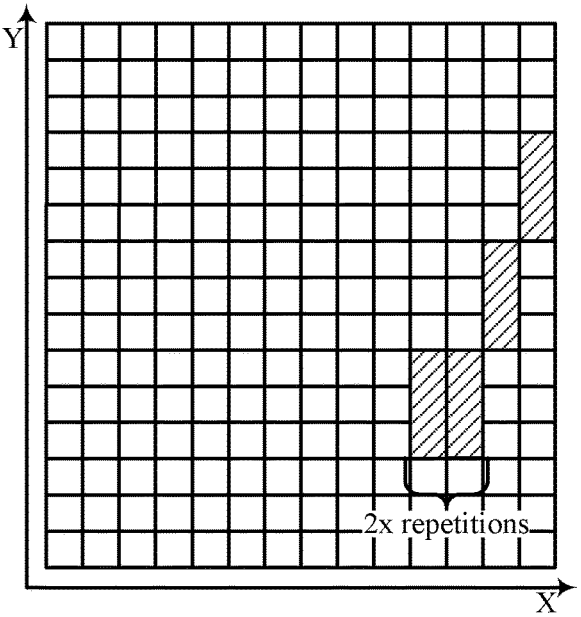

In some examples, the UE may configure the SRS signals according to symbol grouping parameter, 2/1/1 and the UE may configure the SRS transmission as depicted in FIG. 3B such that the first and second SRS signals of the first hop are repeated SRS signals, the third SRS signal of the second hop is a single SRS signal, and the fourth SRS signal of the third hop is a single SRS signal. In some examples, the UE may configure the SRS signals according to symbol grouping parameter, 1/2/1, not shown in an example.

In some examples, a UE may be configured to transmit six SRS signals in six adjacent symbols. The UE may be configured to transmit the SRS signals with a frequency hop of 2. In such cases, the UE may be configured to transmit the SRS signals according to symbol grouping parameter, 1/5, where the first SRS signal is a single SRS transmission in the first hop and the SRS signals in the next five symbols of the second hop are repeated versions of an SRS signal. Additionally or alternatively, the symbol grouping parameter may be 5/1, 2/4, or 4/2.

Additionally or alternatively, UE 115-*a* may be configured to support different comb values, cyclic shift values, or comb offset values for SRSs within one SRS resource. In some examples, the UE may be configured to transmit SRSs of a repetition with different comb values, different cyclic shift, different comb offset, different cyclic offset, etc. A comb value may to the spacing between subcarriers for one or more SRSs, including for one SRS. For example, a comb value of three would indicate that for every three subcarriers in an OFDM symbol, there is an SRS in the first subcarrier of the set of three subcarriers. A comb offset may refer to the start subcarrier in the sounding bandwidth. For example, a comb offset of zero would configure the first SRS in an OFDM symbol to be transmitted in the first subcarrier (e.g., from bottom) of the sounding bandwidth. A cyclic shift is a shift on the antenna set where there may be a phase offset when a signal is transmitted on one antenna.

For example, an SRS resource in a first symbol may be assigned a first comb value, and a repeated SRS resource in a second symbol may be assigned a second comb value. As such, within R adjacent symbols, different comb values, different cyclic shift, different comb offset, or different cyclic shift offset may be used to generate an SRS sequence and map the SRS sequence to the spatial-time-frequency resources. In some examples, a second UE may be assigned the same time and frequency resources, but may use (e.g., be assigned) different comb values, etc. such that the second UE may multiplex with the first UE to transmit in the same set of resources.

Figure 3C:
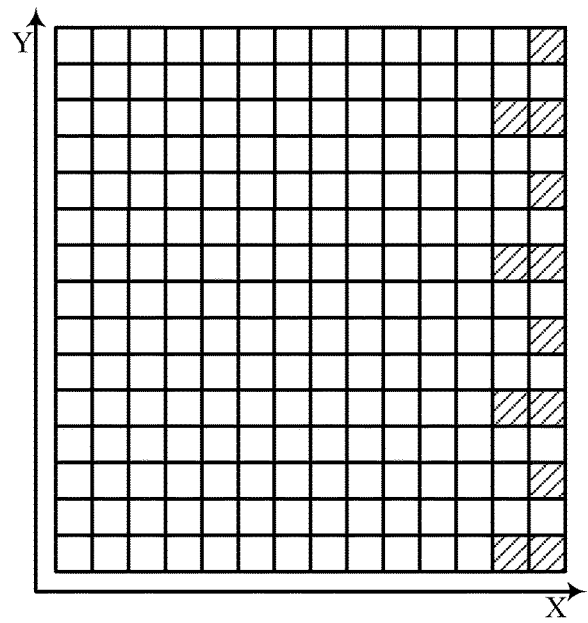

In some examples, a UE may be configured to transmit two SRS signals in two adjacent symbols. The UE may be configured to transmit the SRS signals with a repetition factor of two, where the SRSs in the first symbol are assigned a comb value of four and the SRSs in the second symbol are assigned a comb value of two. In some examples, the UE may configure the SRS transmission as depicted in FIG. 3C such that the SRSs in the second symbol from the right are transmitted according to a comb value of four, and the SRSs in the first symbol from the right are transmitted according to a comb value of two.

Figure 3D:
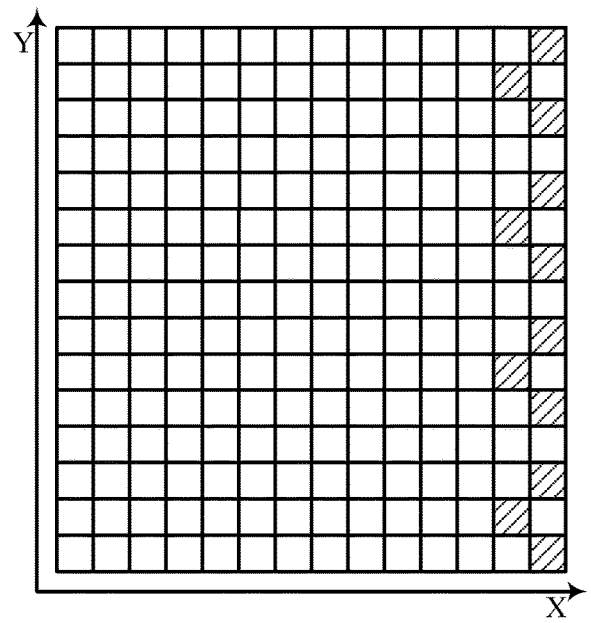

In some examples, a UE may be configured to transmit multiple SRS signals in multiple symbols, for example two SRS signals in two adjacent symbols. The UE may be configured to transmit the SRS signals with a repetition factor, such as a repetition factor of two, where the SRSs in a first symbol may be assigned a first comb value (e.g., of four) and the SRSs in a second symbol may be assigned a second comb value (e.g., of two). In some examples, the SRSs in the first symbol may be assigned a comb offset value of one subcarrier and the SRSs in the second symbol may be assigned a comb offset value of zero subcarriers. In some examples, the UE may configure the SRS transmission as depicted in FIG. 3D such that the SRSs in the second symbol from the right may be transmitted according to a comb value of four where the first SRS from the bottom is shifted one subcarrier up according to the comb offset value, and the SRSs in the first symbol from the right may be transmitted according to a comb value of two where the first SRS from the bottom is not shifted according to the comb offset value.

In some examples, a UE may be configured to transmit two SRS signals in two adjacent symbols. The UE may be configured to transmit the SRS signals with a repetition factor of two, where the SRSs in the first symbol may be assigned a cyclic offset of zero and the SRSs in the second symbol may be assigned a cyclic offset of four. The examples described in relation to FIGS. 3A, 3B, 3C, and 3D are not an exhaustive list and any number of examples and permutations may be possible.

FIGS. 4A, 4B, 4C, and 4D illustrate examples of SRS resource configurations 400, 401, 402, and 403 that support enhanced SRS resource configurations in accordance with aspects of the present disclosure. The SRS resource configurations 400, 401, 402, and 402 may be configured by a base station or a UE, which may be examples of a base station and UE as described with reference to FIGS. 1 and 2. The x axis may be time resources (e.g., OFDM symbols) and the y axis may be frequency resources (e.g., subcarriers). In some examples, a base station may implement enhanced SRS resource configurations. For example, a base station may transmit a set of SRS parameters to a UE that the UE may use to determine an SRS transmission configuration. Additionally or alternatively, other wireless devices, such as the UE, may implement the enhanced SRS resource configurations. The examples described herein do not include an exhaustive list. More examples may be possible. Any of the examples described with reference to FIGS. 2 through 6 may be used in any combination with each other.

In some examples, a UE may be configured to support partial frequency overlap between symbols of different frequency hops. In some examples, for at least two frequency hops, subcarriers in different symbols may at least partially overlap in frequency. In some examples, the overlap may be a part of at least one subcarrier or at least part of one or more subcarriers. In some examples, for every R adjacent symbols, the overlap bandwidth may be the same. In some examples, for every R adjacent symbols, the overlap bandwidth may be different. In some examples, for every R adjacent symbols, the overlap bandwidth may be some combination of the same and the different.

Figure 4A:
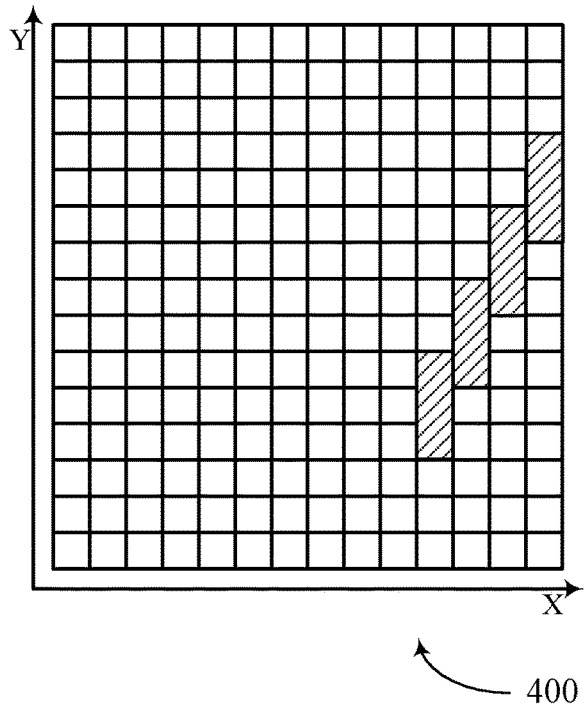

For example, as depicted in FIG. 4A, the UE may be configured to transmit one or more SRSs in one or more frequency hops, such as four SRSs in four frequency hops. Each the four SRSs may be configured such that there is an equal partial frequency overlap, resulting in one or more partial overlaps, such as three partial overlaps.

Figure 4B:
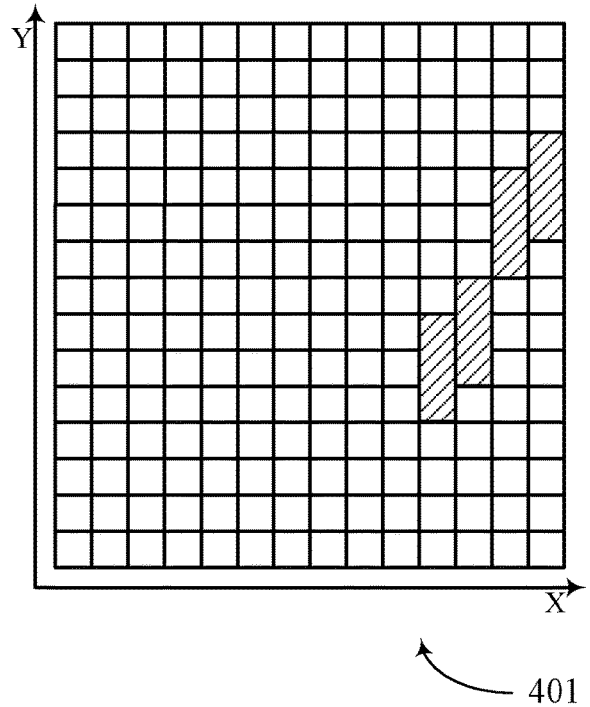

In another example, as depicted in FIG. 4B, the UE may be configured to transmit four SRSs in four frequency hops. The UE may configure the SRSs such that there are two partial frequency overlaps. For example, one may be between the first two SRSs and another may be between the last two SRSs, where the middle two SRSs may not overlap. The partial overlap may be the same between the first two SRSs and the last two SRSs, or the partial overlap may be different.

Figure 4C:
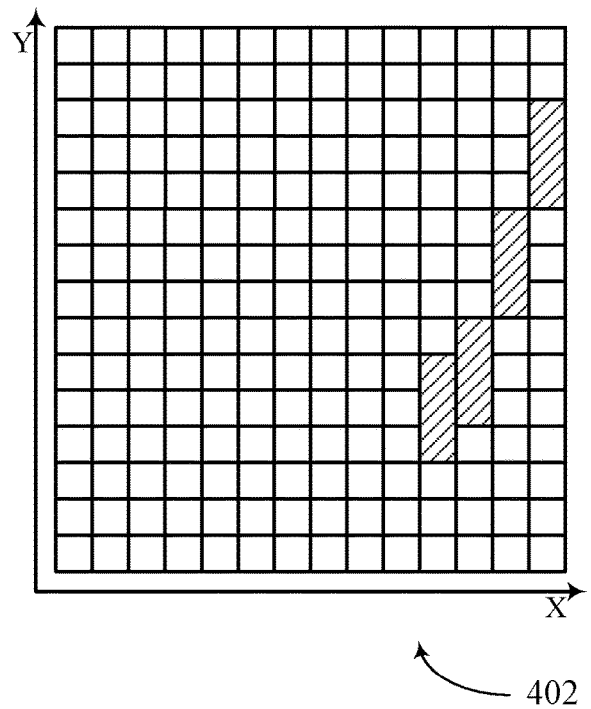

In another example, as depicted in FIG. 4C, the UE may be configured to transmit four SRSs in four frequency hops. The UE may configure the SRSs such that there is at least one partial frequency overlap between the first two SRSs in the first and second frequency hop. One or more SRSs, such as the remaining SRSs, in different hops may not overlap.

Figure 4D:
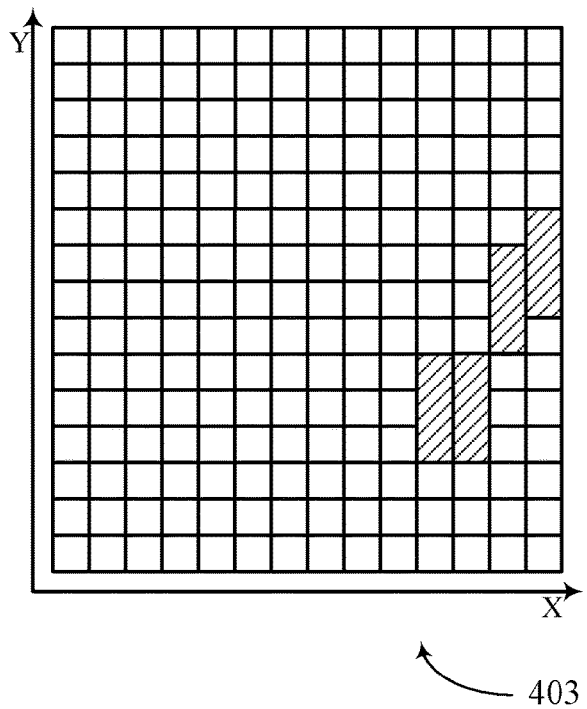

In another example, as depicted in FIG. 4D, the UE may be configured to transmit four SRSs in four frequency hops. The UE may configure the SRSs with one or more different partial frequency overlaps. The first two SRSs may be repeated SRSs with full frequency overlap, and the last two SRS in the last two hops may partial overlap in frequency. The middle two SRSs may not overlap in some examples.

FIGS. 5A and 5B illustrate examples of SRS resource configurations 500 and 501 that support enhanced SRS resource configurations in accordance with aspects of the present disclosure. The SRS resource configurations 500 and 501 may be configured by a base station or a UE, which may be examples of a base station and UE as described with reference to FIGS. 1 and 2. The x axis may be time resources (e.g., OFDM symbols) and the y axis may be frequency resources (e.g., subcarriers). In some examples, a base station may implement enhanced SRS resource configurations. For example, a base station may transmit a set of SRS parameters to a UE that the UE may use to determine an SRS transmission configuration. Additionally or alternatively, other wireless devices, such as the UE, may implement the enhanced SRS resource configurations. The examples described herein do not include an exhaustive list. More examples may be possible. Any of the examples described with reference to FIGS. 2 through 6 may be used in any combination with each other.

In some implementations, a UE may be configured to support different parameter assignments across slots, for example, for periodic or semi-persistent SRS configurations. For example, UE 115-a may configure a first slot with one or more of frequency allocations, comb values, comb offsets, frequency hopping parameters, repetition parameters, etc. and may configure a second slot with one or more of frequency allocations, comb values, comb offsets, frequency hopping parameters, repetition parameters, etc. where the parameter values assigned to the first slot versus the second slot may be the same, or different, or some combination of both. In some examples, for periodic or semi-persistent SRS configurations, the parameters may be changed according to one or more indices, such as a frame or slot index, cyclically or by a pre-defined order.

For example, as depicted in FIG. 5A, the UE may be configured with periodic or semi-persistent SRSs over one or more slots, such as three slots. In each of the slots, the UE may be configured to arrange the SRSs over a number of symbols and a number of hops, such as four OFDM symbols and with three hops. Each of the slots may be arranged differently in some examples, but according to the symbol parameters and the hop parameters. The first slot may be configured according to a 1/1/2 symbol grouping such that there may be one SRS in the first symbol of the first hop, there may be one SRS in the second symbol of the second hop, and there may be two SRSs in the third and fourth symbol of the third hop.

The second slot may be configured differently than the first slot or the same as the first slot. In some examples, the second slot may be configured according to a 1/2/1 symbol grouping such that there may be one SRS in the first symbol of the first hop, there may be two SRSs in the second and third symbols of the second hop, and there may be one SRS in the fourth symbol of the third hop.

The third slot may be configured differently than the first slot, or the second slot, or both, or the third slot may be configured similar to the first slot, or the second slot, or both, or any combination of these. In some examples, the third slot may be configured according to a 2/1/1 symbol grouping such that there may be two SRSs in the first and second symbol of the first hop, there may be one SRS in the third symbol of the second hop, and there may be one SRS in the fourth symbol of the third hop.

In some implementations, as depicted in FIG. 5B, the UE may be configured with periodic or semi-persistent SRSs over two slots. In each of the slots, the UE may be configured to arrange the SRS over one or more symbols, such as one or more OFDM symbols, with different comb values. For example, the UE may configure the SRSs of the first slot with a first comb value (e.g., of four) and configure the SRSs of the second slot with a second comb value (e.g., of two). In some examples, the UE may be configured with more than two slots and the comb value for at least some if not each of the slots may follow a pattern such that the comb value for at least some if not each slot may switch between a first value (e.g., a two) and a second value (e.g., a four) for each new slot (e.g., four, two, four, two, four, two).

Figure 6:
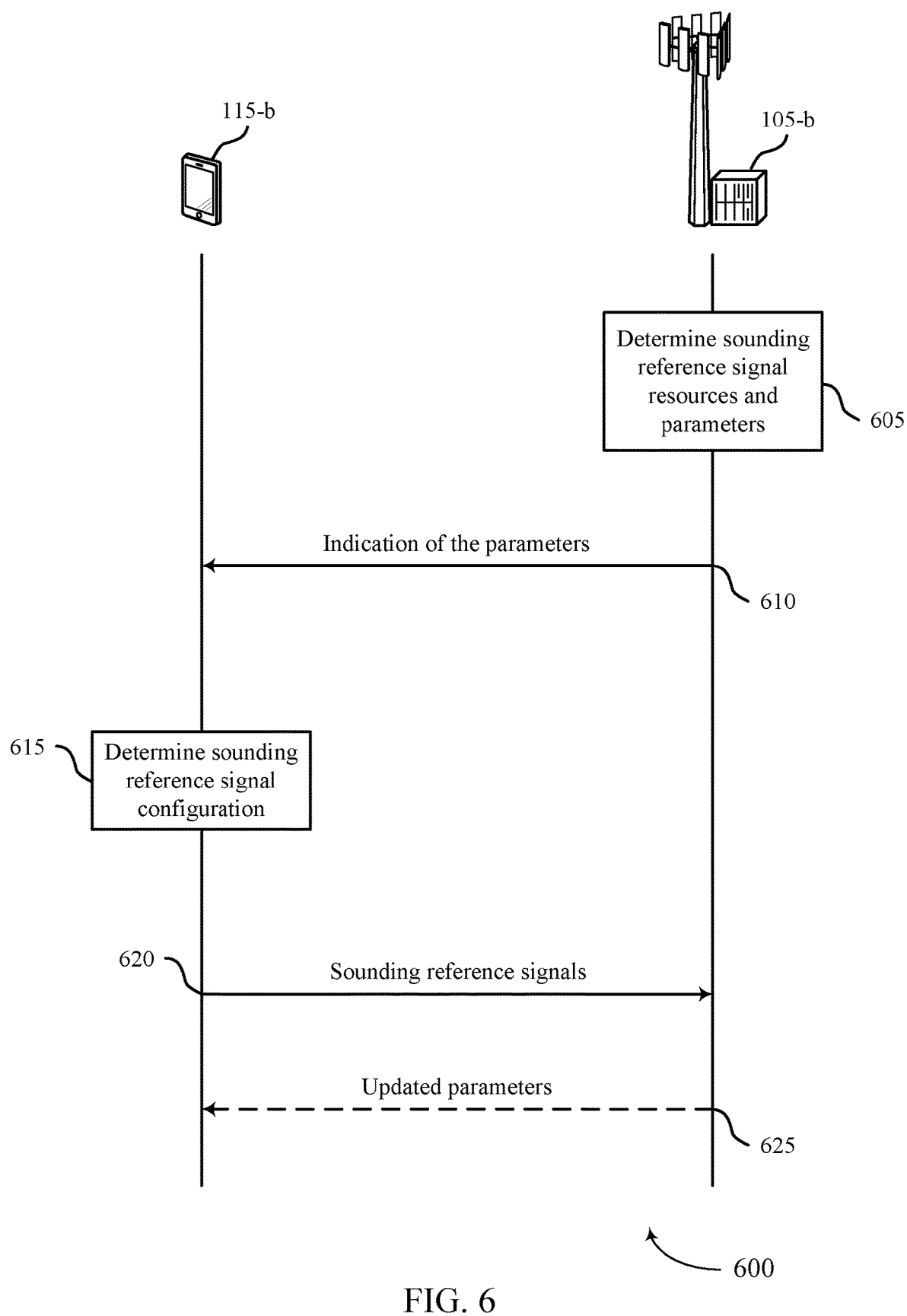
FIG. 6 illustrates an example of a process flow that supports enhanced SRS resource configurations in accordance with aspects of the present disclosure.

FIG. 6 illustrates an example of a process flow 600 that supports enhanced SRS resource configurations in accordance with aspects of the present disclosure. The process flow 600 may illustrate an example SRS configuration scheme. For example, base station 105-*b* may assign a set of SRS parameters to UE 115-*a*. Base station 105-*b* and UE 115-*b* may be examples of the corresponding wireless devices described with reference to FIGS. 1 and 2. In some examples, instead of base station 105-*b* implementing the SRS configuration scheme, a different type of wireless device (e.g., a UE 115) may determine the SRS configuration. Alternative examples of the following may be implemented, where some steps are performed in a different order than described or are not performed at all. In some examples, steps may include additional features not mentioned below, or further steps may be added.

At 605, base station 105-*b* may determine a set of SRS resources for transmitting one or more SRSs from UE 115-*b* and a set of SRS parameters corresponding to the set of SRS resources.

At 610, UE 115-*b* may receive, from base station 105-*b*, an indication of a set of SRS parameters corresponding to a set of SRS resources for transmitting one or more SRSs. In some examples, the indication of the set of SRS parameters may activate an SRS configuration. In some examples, the indication of the set of SRS parameters may be transmitted via RRC signaling, or may be transmitted dynamically via DCI, MAC-CE, etc. In some examples, the DCI or MAC-CE may activate the pre-defined configuration. In some examples, the DCI or MAC-CE may be used to directly configure the SRS parameters.

At 615, UE 115-*b* may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof.

At 620, UE 115-*b* may transmit the one or more SRSs to the base station based on the SRS configuration.

At 625, UE 115-*b* may optionally receive, from base station 105-*b*, an indication of an updated set of SRS parameters corresponding to a set of SRS resources for transmitting one or more SRSs. In some examples, the updated set of parameters may be received via DCI or MAC-CE. In some examples, UE 115-*b* may receive the original set of parameters and updated set of parameters both via RRC signaling. Additionally or alternatively, UE 115*b* may receive the original set of parameters and update the set of parameters via DCI, or a MAC-CE, or both. Additionally or attentively, UE 115 b may receive the original set of parameters via RRC signaling and receiving the updated set of parameters via DCI or a MAC-CE.

Figure 7:
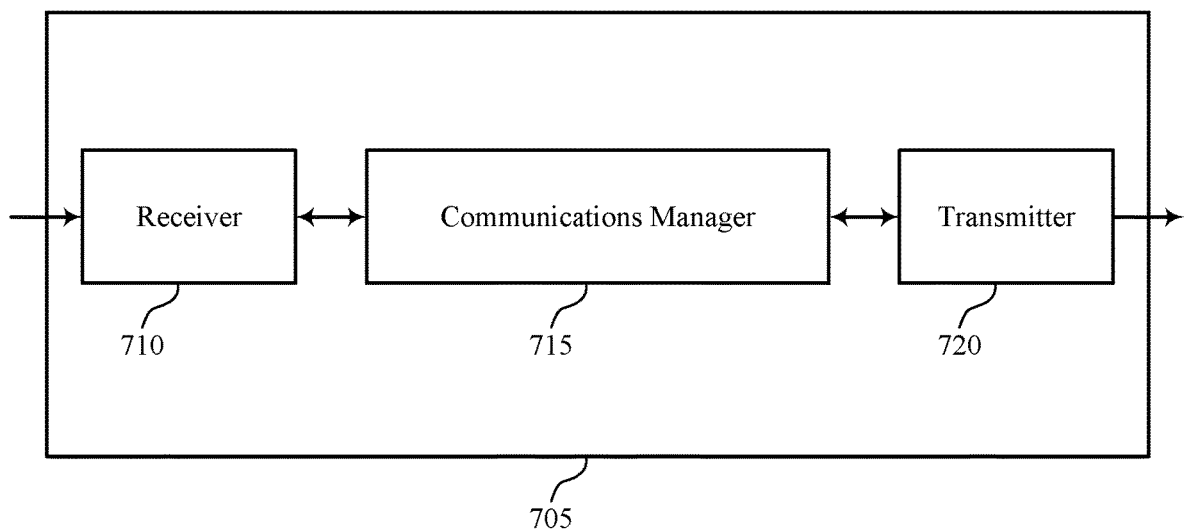
FIGS. 7 and 8 show block diagrams of devices that support enhanced SRS resource configurations in accordance with aspects of the present disclosure.

FIG. 7 shows a block diagram 700 of a device 705 that supports enhanced SRS resource configurations in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to enhanced SRS resource configurations, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, an indication of a set of SRS parameters corresponding to a set of SRS resources for transmitting one or more SRSs. The communications manager 715 may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The communications manager 715 may transmit the one or more SRSs to the base station based on the SRS configuration. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

The communications manager 715 as described herein may be implemented to realize one or more potential advantages. One implementation may allow the device 705 to more effectively configure SRS resources, and more specifically to improve the flexibility in SRS configurations. For example, the device 805 may receive a set of SRS parameters from a base station and determine an SRS configuration for transmitting SRS to the base station, where the received parameters may allow the UE to configure the SRS resources more efficiently.

Based on implementing the SRS configuration mechanisms as described herein, a processor of a UE 115 (e.g., controlling the receiver 710, the transmitter 720, or the transceiver 1020 as described with reference to FIG. 10) may increase SRS resource utilization efficiency and increase SRS resource flexibility in the configuration of SRS resources because the number of parameters a UE may be configured with may be increased and may be less constrained.

Figure 8:
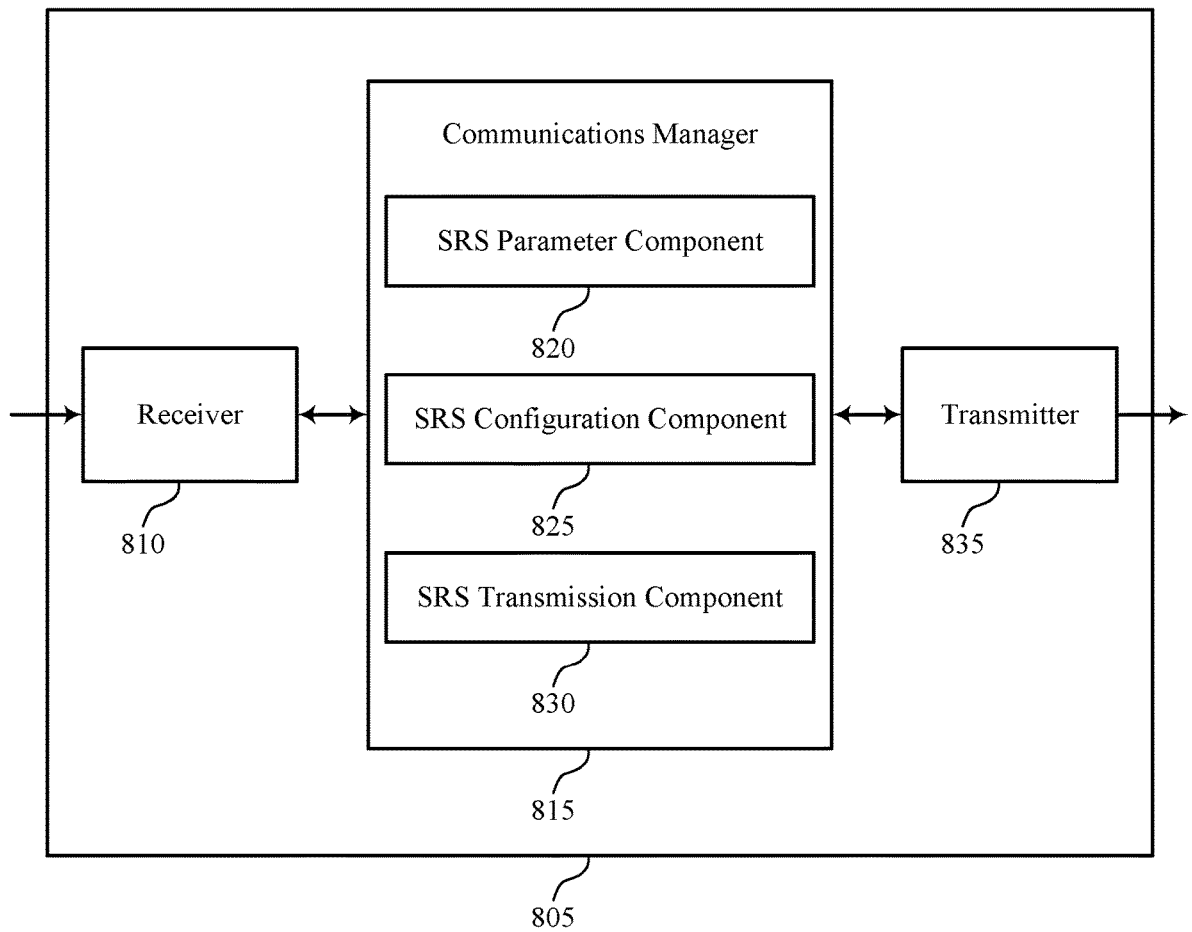

FIG. 8 shows a block diagram 800 of a device 805 that supports enhanced SRS resource configurations in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to enhanced SRS resource configurations, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an SRS parameter component 820, an SRS configuration component 825, and an SRS transmission component 830. The communications manager 815 may be an example of aspects of the communications manager 1010 described herein.

The SRS parameter component 820 may receive, from a base station, an indication of a set of SRS parameters corresponding to a set of SRS resources for transmitting one or more SRSs. The SRS configuration component 825 may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The SRS transmission component 830 may transmit the one or more SRSs to the base station based on the SRS configuration.

The transmitter 835 may transmit signals generated by other components of the device 805. In some examples, the transmitter 835 may be collocated with a receiver 810 in a transceiver component. For example, the transmitter 835 may be an example of aspects of the transceiver 1020 described with reference to FIG. 10. The transmitter 835 may utilize a single antenna or a set of antennas.

Figure 9:
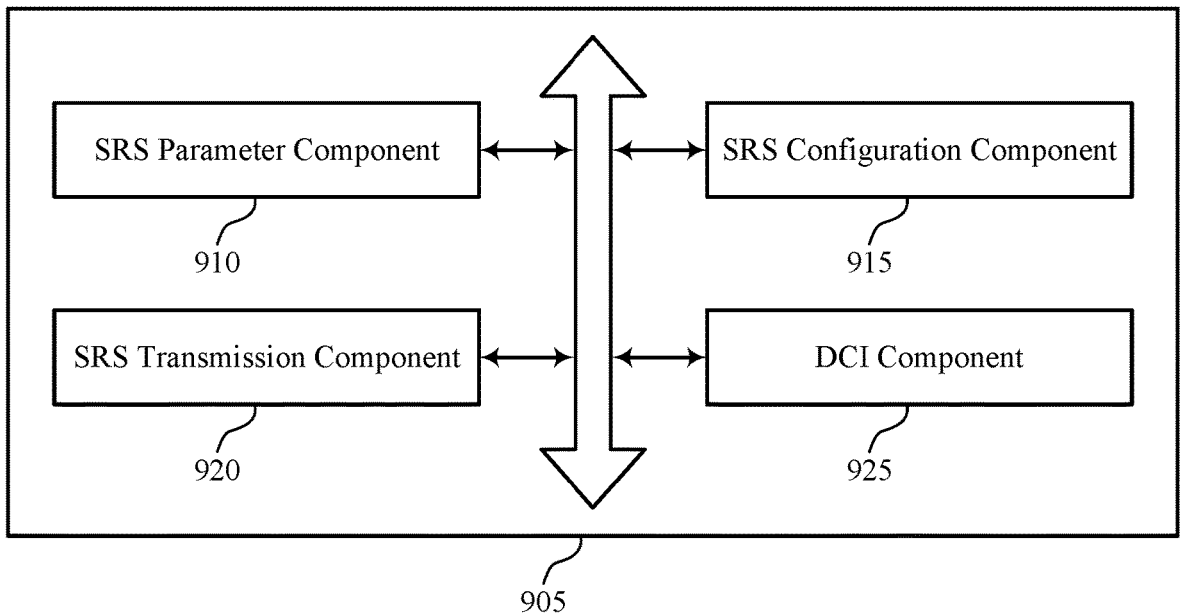
FIG. 9 shows a block diagram of a communications manager that supports enhanced SRS resource configurations in accordance with aspects of the present disclosure.

FIG. 9 shows a block diagram 900 of a communications manager 905 that supports enhanced SRS resource configurations in accordance with aspects of the present disclosure. The communications manager 905 may be an example of aspects of a communications manager 715, a communications manager 815, or a communications manager 1010 described herein. The communications manager 905 may include an SRS parameter component 910, an SRS configuration component 915, an SRS transmission component 920, and a DCI component 925. Each of these components may communicate, directly or indirectly, with one another (e.g., via one or more buses).

The SRS parameter component 910 may receive, from a base station, an indication of a set of SRS parameters corresponding to a set of SRS resources for transmitting one or more SRSs. The SRS configuration component 915 may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. In some examples, the SRS transmission component 920 may transmit the one or more SRSs to the base station based on the updated SRS configuration. The SRS transmission component 920 may transmit the one or more SRSs to the base station based on the SRS configuration.

In some examples, the SRS parameter component 910 may receive an indication of the number of symbols for which the SRS may be configured, the number of symbols being greater than four symbols. In some examples, the SRS parameter component 910 may receive an indication of the number of symbols for which the SRS may be configured, the number of symbols being up to fourteen symbols.

In some examples, receiving an indication of the set of SRS parameters includes receiving an indication of the non-uniform grouping for the one or more SRSs for an SRS resource of the set of SRS resources or of a second set of SRS resources. In some examples, the SRS configuration component 915 may determine the non-uniform grouping for the one or more SRSs based on receiving the indication of the non-uniform grouping. In some examples, the SRS configuration component 915 may determine that the one or more SRSs are each mapped to a different set of subcarriers across different symbols of the SRS resource.

In some examples, the SRS configuration component 915 may determine that one of the one or more SRSs is repeated on a same set of subcarriers across contiguous symbols of the SRS resource. In some examples, the SRS configuration component 915 may determine that one of the one or more SRSs is not repeated on a same set of subcarriers across contiguous symbols of the SRS resource. In some examples, the SRS configuration component 915 may determine that one of the one or more SRSs is transmitted on a first group of subcarriers on at least a first symbol of the SRS resource. In some examples, the SRS configuration component 915 may determine that one of the one or more SRSs is transmitted on a second group of subcarriers on at least a second symbol of the SRS resource.

In some examples, receiving an indication of the set of SRS parameters includes receiving an indication of a comb value for one or more symbols of an SRS resource of the set of SRS resources. In some examples, the SRS parameter component 910 may set a first comb value for a first symbol of the one or more symbols of the SRS resource and setting a second comb value for a second symbol of the one or more symbols of the SRS resource.

In some examples, receiving an indication of the set of SRS parameters includes receiving an indication of a cyclic shift value or a cyclic shift offset for one or more symbols of an SRS resource of the set of SRS resources. In some examples, the SRS parameter component 910 may set a first cyclic shift value or a first cyclic shift offset for a first symbol of the one or more symbols of the SRS resource and setting a second cyclic shift value or a second cyclic shift offset for a second symbol of the one or more symbols of the SRS resource.

In some examples, receiving an indication of the set of SRS parameters includes receiving an indication of a comb offset value for one or more symbols of an SRS resource of the set of SRS resources. In some examples, the SRS parameter component 910 may set a first comb offset value for a first symbol of the one or more symbols of the SRS resource and setting a second comb offset value for a second symbol of the one or more symbols of the SRS resource.

In some examples, receiving an indication of the set of SRS parameters includes receiving an indication that partial frequency overlapping for symbols of an SRS resource of the set of SRS resources is configured. In some examples, the SRS parameter component 910 may set a first set of subcarriers for a first symbol of the set of SRS resources and a second set of subcarriers for a second symbol of the set of SRS resources, the first set of subcarriers at least partially overlapping with the second set of subcarriers.

In some examples, the SRS parameter component 910 may receive an indication of a symbol grouping parameter indicating one or more of a number of frequency hops or a number of symbols per frequency hop for the SRS configuration. In some examples, a frequency allocation, a comb value, a cyclic shift, a cyclic shift offset, a comb offset, a frequency hopping parameter, a repetition parameter, a symbol grouping parameter, or any combination thereof.

In some examples, the SRS parameter component 910 may receive RRC signaling including the indication of the set of SRS parameters. In some examples, the SRS parameter component 910 may receive DCI or a MAC-CE including the indication of the set of SRS parameters.

In some examples, the SRS configuration component 915 may determine that each of one or more antenna ports for the SRS resource is mapped to a single set of subcarriers across one or more pairs of the symbols of the SRS resource. In some examples, the SRS configuration component 915 may determine that the SRS configuration is unsupported based on determining that each of the one or more antenna ports of for the SRS resource is mapped to the single set of subcarriers across the one or more pairs of the symbols of the SRS resource, where transmitting the one or more SRSs to the base station is based on determining that the SRS configuration is unsupported. In some examples, the SRS configuration component 915 may determine the non-uniform grouping for the one or more SRSs based on determining that each of the one or more antenna ports of for the SRS resource is mapped to the single set of subcarriers across the one or more pairs of the symbols of the SRS resource, where transmitting the one or more SRSs to the base station is based on determining the non-uniform grouping for the one or more SRSs.

In some examples, the SRS configuration component 915 may set a number of frequency hops for at least one of the one or more SRSs, or setting a number of symbols of each frequency hop for at least one of the one or more SRSs, or both. In some examples, the SRS configuration component 915 may set a third set of subcarriers for a third symbol of the set of SRS resources, the third set of subcarriers at least partially overlapping with the second set of subcarriers a same amount as the first set of subcarriers at least partially overlap with the second set of subcarriers. In some examples, the SRS configuration component 915 may set a third set of subcarriers for a third symbol of the set of SRS resources, the third set of subcarriers at least partially overlapping with the second set of subcarriers a different amount as the first set of subcarriers at least partially overlap with the second set of subcarriers. In some examples, the SRS configuration component 915 may set a third set of subcarriers for a third symbol of the set of SRS resources and a fourth set of subcarriers for a fourth symbol of the set of SRS resources, the fourth set of subcarriers at least partially overlapping with the third set of subcarriers a same amount as the first set of subcarriers at least partially overlap with the second set of subcarriers.

In some examples, the SRS configuration component 915 may set a third set of subcarriers for a third symbol of the set of SRS resources and a fourth set of subcarriers for a fourth symbol of the set of SRS resources, the fourth set of subcarriers at least partially overlapping with the third set of subcarriers a different amount as the first set of subcarriers at least partially overlap with the second set of subcarriers. In some examples, the SRS configuration component 915 may set a third set of subcarriers for a third symbol of the set of SRS resources and a fourth set of subcarriers for a fourth symbol of the set of SRS resources, the fourth set of subcarriers not overlapping with the third set of subcarriers. In some examples, the SRS configuration component 915 may determine a first SRS configuration for a first subset of a slot and determining a second SRS configuration for a subset of the slot, and where the SRSs include one or more of a periodic SRS or a semi-persistent SRS.

In some examples, the SRS configuration component 915 may determine one or more SRS parameters of the set of SRS parameters for the first SRS configuration that are different than one or more SRS parameters of the set of SRS parameters for the second SRS configuration based on a frame index, a slot index, a periodic timing, a defined order, or any combination thereof.

In some examples, the SRS configuration component 915 may select a defined configuration based on receiving the DCI or the MAC-CE. In some examples, the SRS configuration component 915 may set one or more SRS parameters of the set of SRS parameters for the SRS configuration based on receiving the DCI or the MAC-CE. In some examples, the SRS configuration component 915 may update the SRS configuration for the one or more SRSs based on the second set of SRS parameters. In some examples, a configuration for the periodic SRS or the semi-persistent SRS. The DCI component 925 may receive DCI or a MAC-CE including an indication of a second set of SRS parameters.

Figure 10:
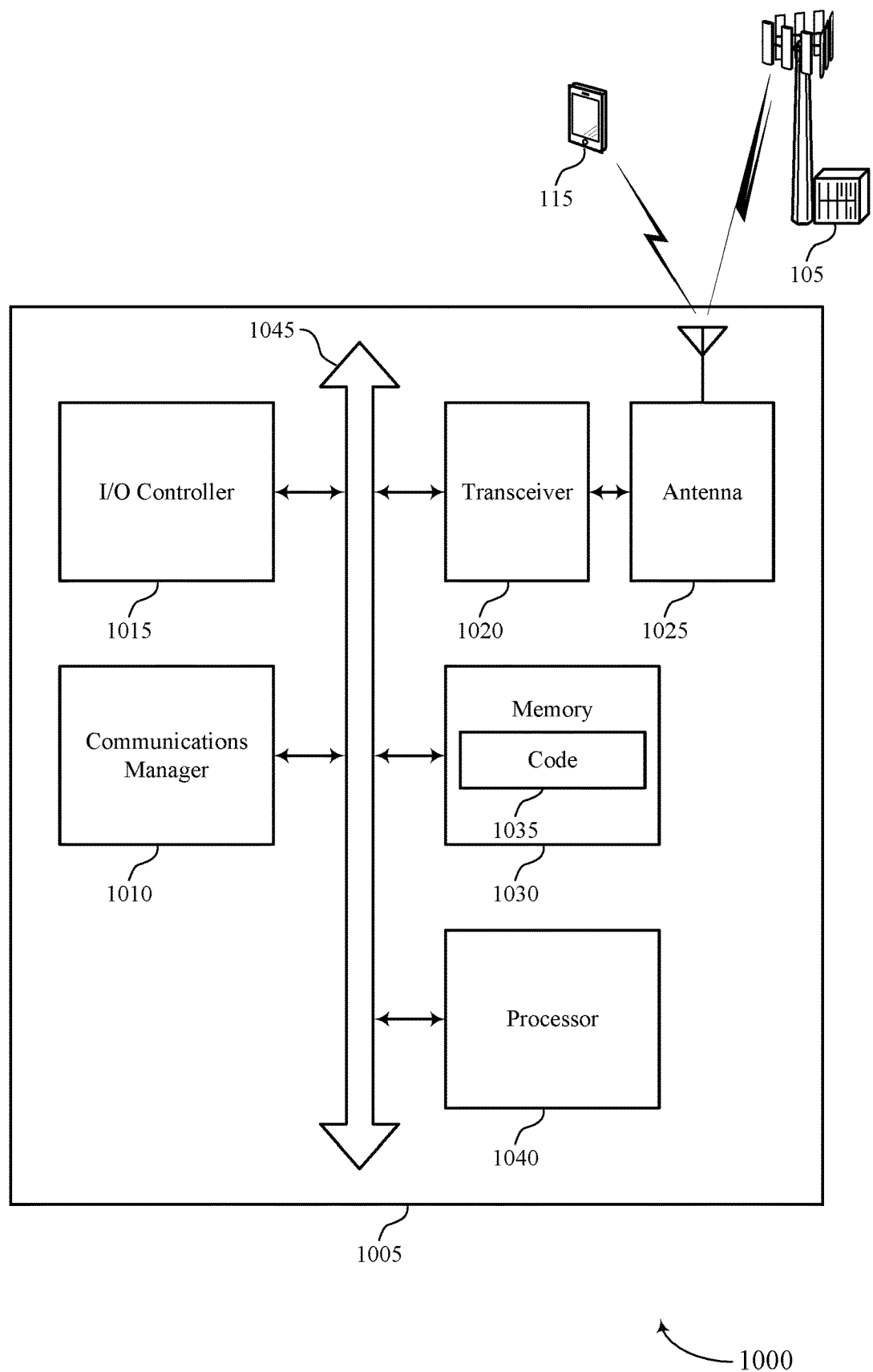
FIG. 10 shows a diagram of a system including a device that supports enhanced SRS resource configurations in accordance with aspects of the present disclosure.

FIG. 10 shows a diagram of a system 1000 including a device 1005 that supports enhanced SRS resource configurations in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, an indication of a set of SRS parameters corresponding to a set of SRS resources for transmitting one or more SRSs. The communications manager 1010 may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The communications manager 1010 may transmit the one or more SRSs to the base station based on the SRS configuration.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some examples, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some examples, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some examples, the wireless device may include a single antenna 1025. However, in some examples the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some examples, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced SRS resource configurations).

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (e.g., when compiled and executed) to perform functions described herein.

Figure 11:
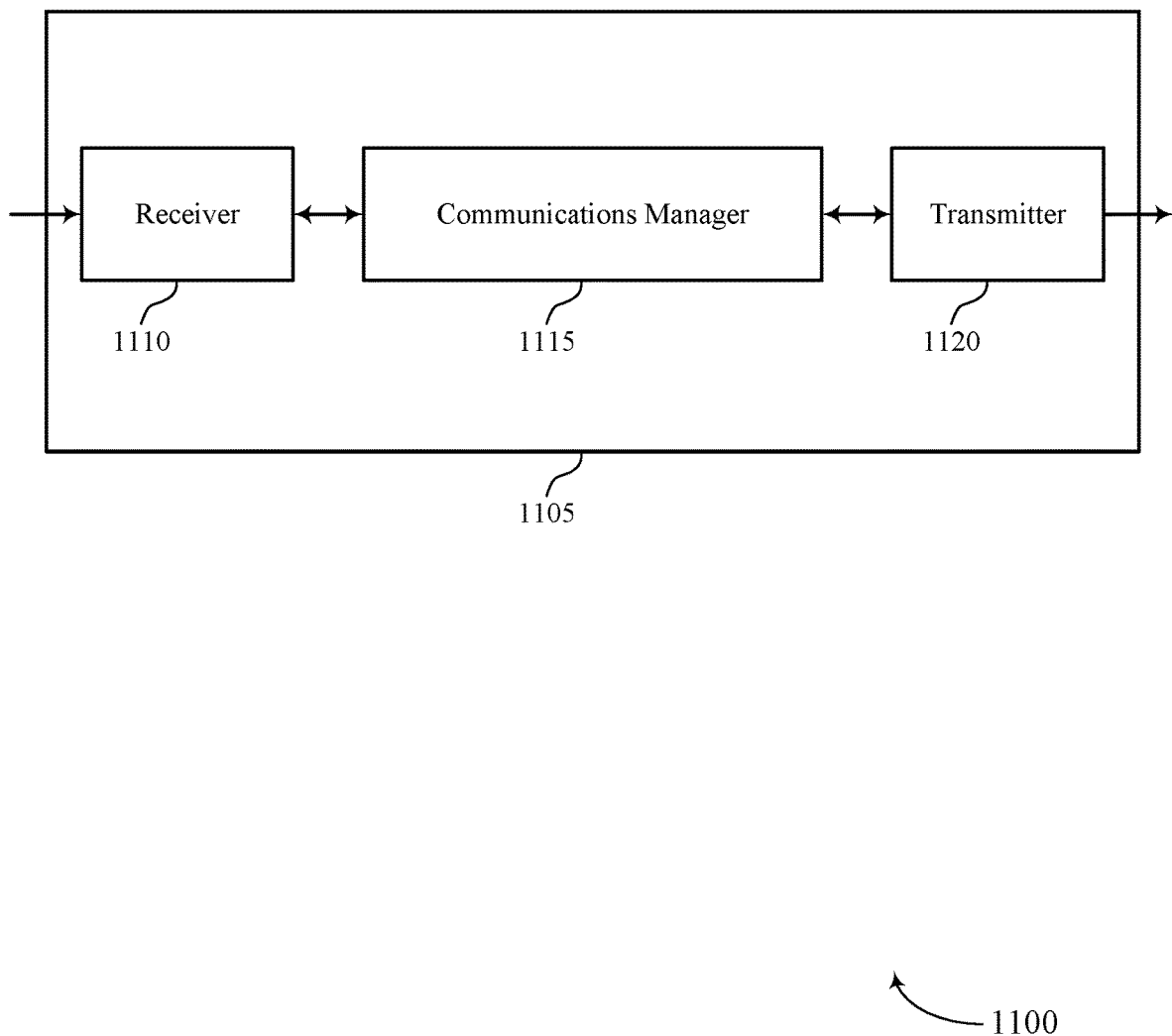
FIGS. 11 and 12 show block diagrams of devices that support enhanced SRS resource configurations in accordance with aspects of the present disclosure.

FIG. 11 shows a block diagram 1100 of a device 1105 that supports enhanced SRS resource configurations in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to enhanced SRS resource configurations, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine a set of SRS resources for transmitting one or more SRSs from a UE and a set of SRS parameters corresponding to the set of SRS resources. The communications manager 1115 may transmit, to the UE, an indication of the set of SRS parameters corresponding to the set of SRS resources for transmitting one or more SRSs from the UE. The communications manager 1115 may receive the one or more SRSs from the UE based on an SRS configuration, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
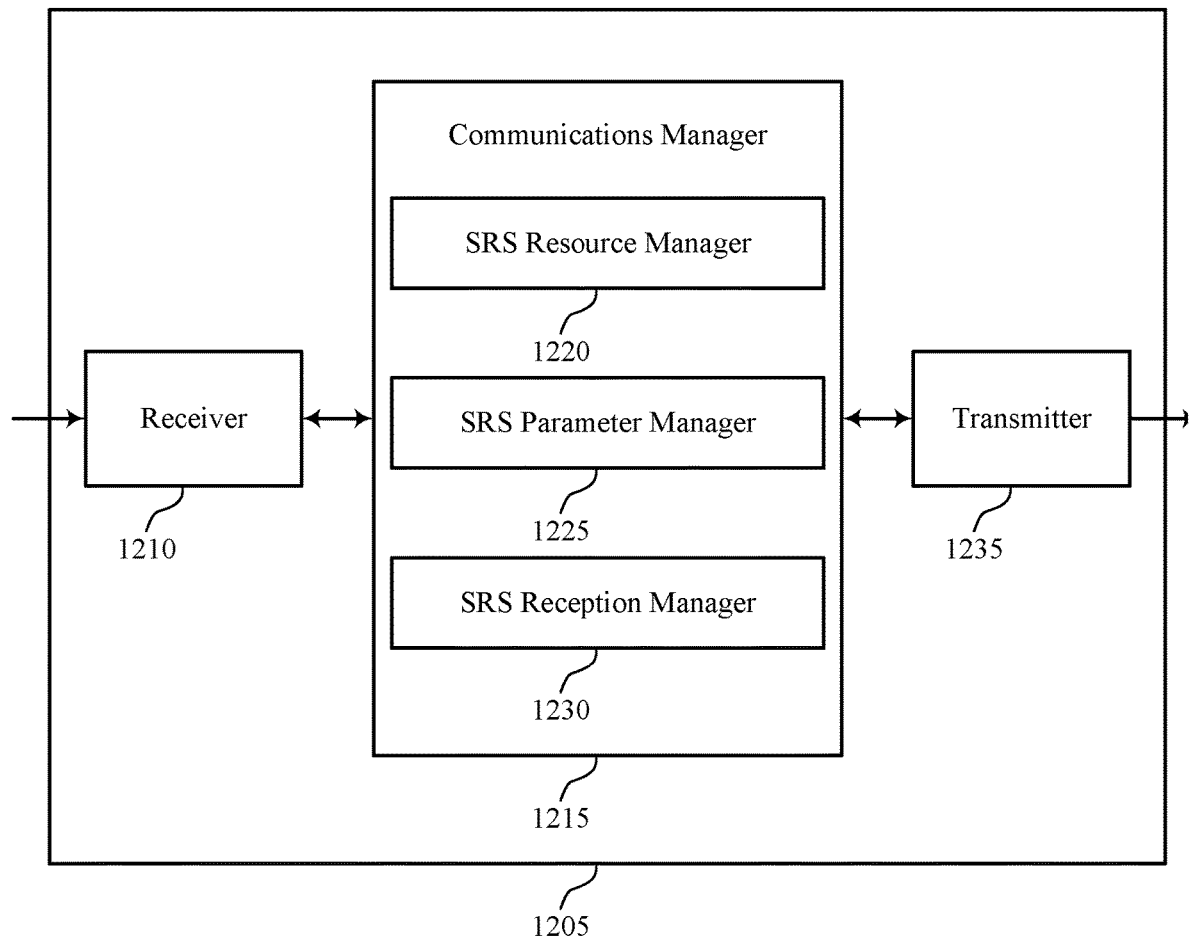

FIG. 12 shows a block diagram 1200 of a device 1205 that supports enhanced SRS resource configurations in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to enhanced SRS resource configurations, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SRS resource manager 1220, an SRS parameter manager 1225, and an SRS reception manager 1230. The communications manager 1215 may be an example of aspects of the communications manager 1410 described herein.

The SRS resource manager 1220 may determine a set of SRS resources for transmitting one or more SRSs from a UE and a set of SRS parameters corresponding to the set of SRS resources. The SRS parameter manager 1225 may transmit, to the UE, an indication of the set of SRS parameters corresponding to the set of SRS resources for transmitting one or more SRSs from the UE. The SRS reception manager 1230 may receive the one or more SRSs from the UE based on an SRS configuration, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof.

The transmitter 1235 may transmit signals generated by other components of the device 1205. In some examples, the transmitter 1235 may be collocated with a receiver 1210 in a transceiver component. For example, the transmitter 1235 may be an example of aspects of the transceiver 1420 described with reference to FIG. 14. The transmitter 1235 may utilize a single antenna or a set of antennas.

Figure 13:
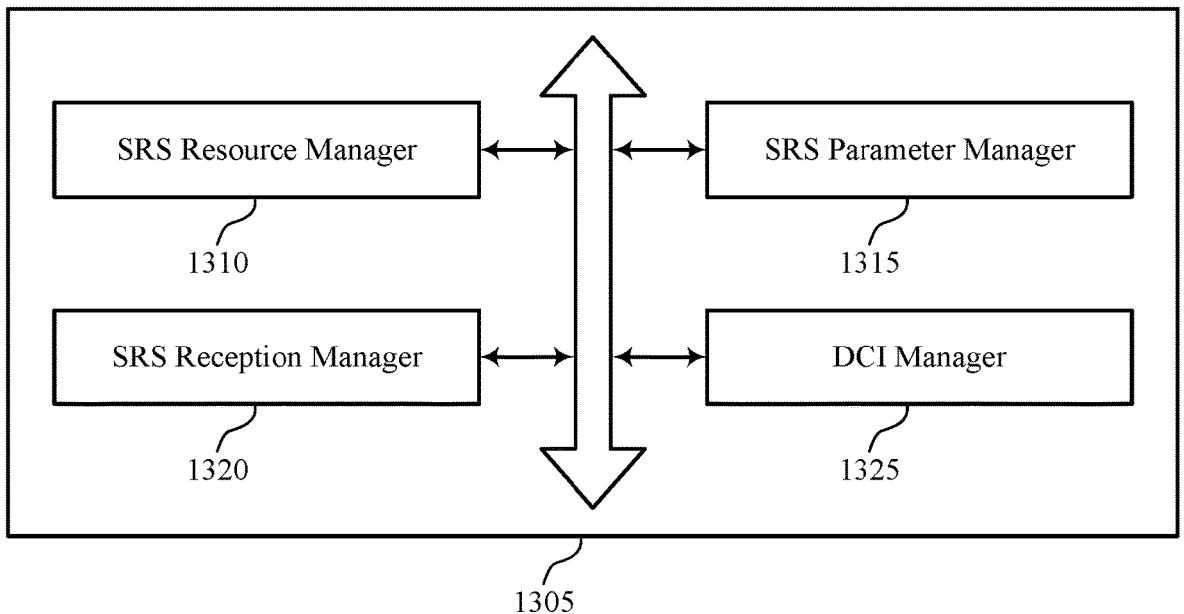
FIG. 13 shows a block diagram of a communications manager that supports enhanced SRS resource configurations in accordance with aspects of the present disclosure.

FIG. 13 shows a block diagram 1300 of a communications manager 1305 that supports enhanced SRS resource configurations in accordance with aspects of the present disclosure. The communications manager 1305 may be an example of aspects of a communications manager 1115, a communications manager 1215, or a communications manager 1410 described herein. The communications manager 1305 may include an SRS resource manager 1310, an SRS parameter manager 1315, an SRS reception manager 1320, and a DCI manager 1325. Each of these components may communicate, directly or indirectly, with one another (e.g., via one or more buses).

The SRS resource manager 1310 may determine a set of SRS resources for transmitting one or more SRSs from a UE and a set of SRS parameters corresponding to the set of SRS resources. The SRS parameter manager 1315 may transmit, to the UE, an indication of the set of SRS parameters corresponding to the set of SRS resources for transmitting one or more SRSs from the UE. The SRS reception manager 1320 may receive the one or more SRSs from the UE based on an SRS configuration, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof.

In some examples, the SRS parameter manager 1315 may transmit an indication of the number of symbols for which the SRS may be configured, the number of symbols being greater than four symbols. In some examples, the SRS parameter manager 1315 may transmit an indication of the number of symbols for which the SRS may be configured, the number of symbols being up to fourteen symbols. In some examples, the SRS parameter manager 1315 may transmit an indication of the non-uniform grouping for the one or more SRSs for an SRS resource of the set of SRS resources or of a second set of SRS resources.

In some examples, the SRS parameter manager 1315 may transmit an indication of a comb value for one or more symbols of an SRS resource of the set of SRS resources. In some examples, the SRS parameter manager 1315 may transmit an indication of a cyclic shift value or a cyclic shift offset for one or more symbols of an SRS resource of the set of SRS resources. In some examples, the SRS parameter manager 1315 may transmit an indication of a comb offset value for one or more symbols of an SRS resource of the set of SRS resources. In some examples, the SRS parameter manager 1315 may transmit an indication that partial frequency overlapping for symbols of an SRS resource of the set of SRS resources is configured.

In some examples, the SRS parameter manager 1315 may transmit an indication of a symbol grouping parameter indicating one or more of a number of frequency hops or a number of symbols per frequency hop for the SRS configuration. In some examples, the SRS parameter manager 1315 may transmit RRC signaling including the indication of the set of SRS parameters. In some examples, the SRS parameter manager 1315 may transmit DCI or a MAC-CE including the indication of the set of SRS parameters.

In some examples, a frequency allocation, a comb value, a cyclic shift, a cyclic shift offset, a comb offset, a frequency hopping parameter, a repetition parameter, a symbol grouping parameter, or any combination thereof. In some examples, the SRS reception manager 1320 may receive the one or more SRSs to the base station based on the updated SRS configuration. The DCI manager 1325 may transmit DCI or a MAC-CE including an indication of a second set of SRS parameters.

Figure 14:
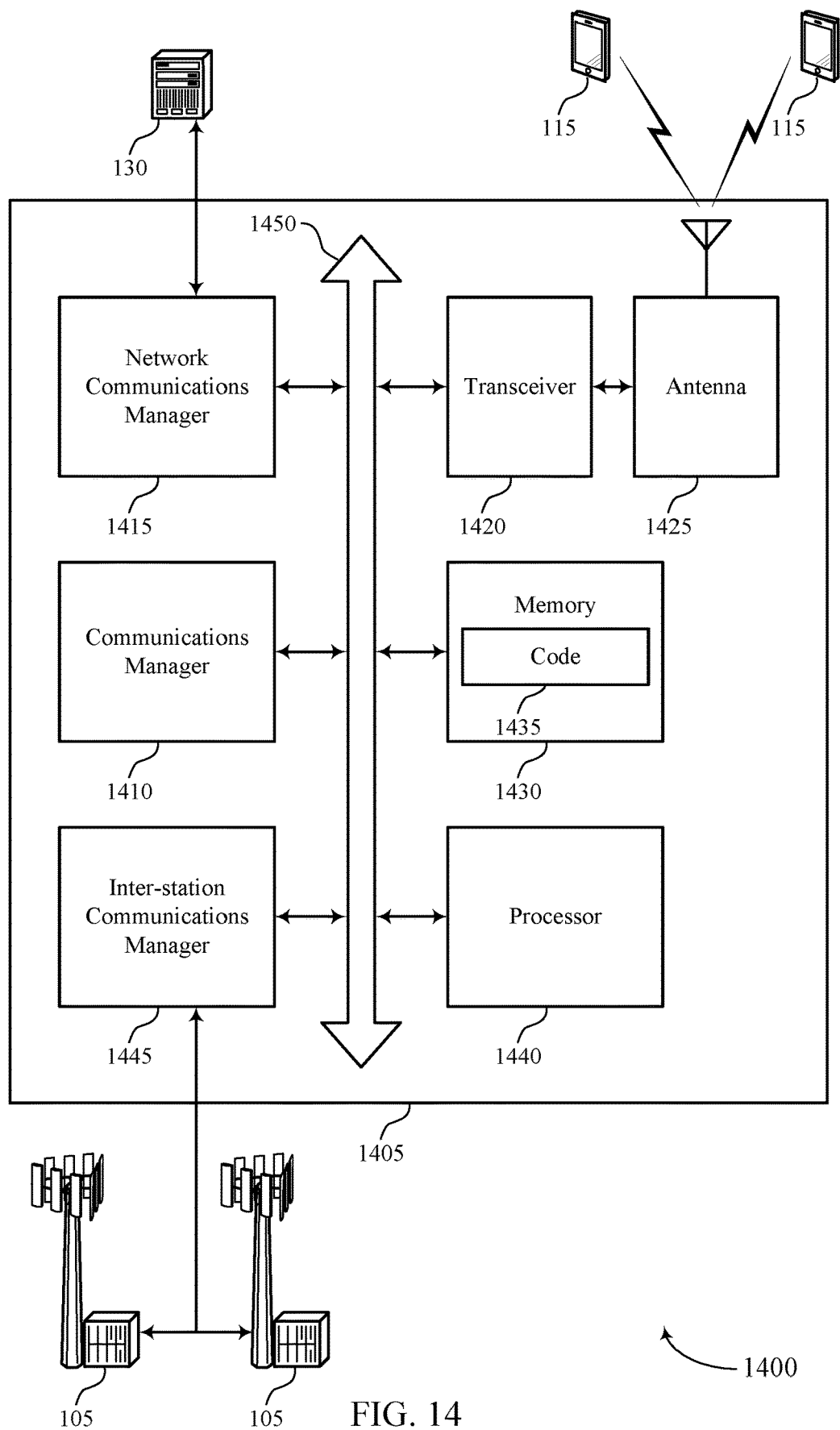
FIG. 14 shows a diagram of a system including a device that supports enhanced SRS resource configurations in accordance with aspects of the present disclosure.

FIG. 14 shows a diagram of a system 1400 including a device 1405 that supports enhanced SRS resource configurations in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine a set of SRS resources for transmitting one or more SRSs from a UE and a set of SRS parameters corresponding to the set of SRS resources, transmit, to the UE, an indication of the set of SRS parameters corresponding to the set of SRS resources for transmitting one or more SRSs from the UE, and receive the one or more SRSs from the UE based on an SRS configuration, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some examples, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In some examples, a memory controller may be integrated into processor 1440. The processor 1440 may be configured to execute computer-readable instructions stored in a memory (e.g., the memory 1430) to cause the device 1405 to perform various functions (e.g., functions or tasks supporting enhanced SRS resource configurations).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (e.g., when compiled and executed) to perform functions described herein.

Figure 15:
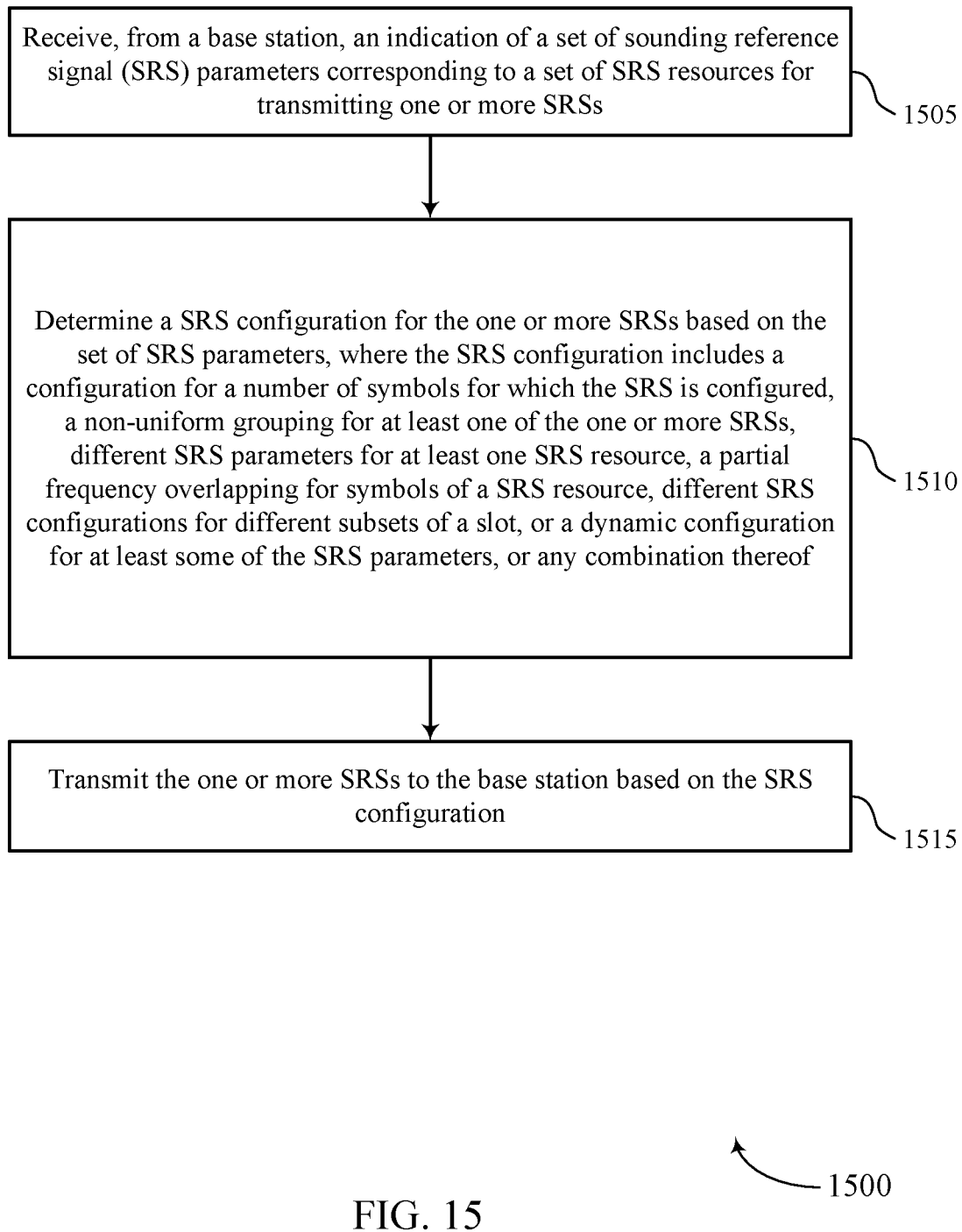
FIGS. 15 through 18 show flowcharts illustrating methods that support enhanced SRS resource configurations in accordance with aspects of the present disclosure.

FIG. 15 shows a flowchart illustrating a method 1500 that supports enhanced SRS resource configurations in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a set of SRS parameters corresponding to a set of SRS resources for transmitting one or more SRSs. The operations of 1505 may be performed according to the methods described herein. In some examples, aspects of the operations of 1505 may be performed by an SRS parameter component as described with reference to FIGS. 7 through 10.

At 1510, the UE may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The operations of 1510 may be performed according to the methods described herein. In some examples, aspects of the operations of 1510 may be performed by an SRS configuration component as described with reference to FIGS. 7 through 10.

At 1515, the UE may transmit the one or more SRSs to the base station based on the SRS configuration. The operations of 1515 may be performed according to the methods described herein. In some examples, aspects of the operations of 1515 may be performed by an SRS transmission component as described with reference to FIGS. 7 through 10.

Figure 16:
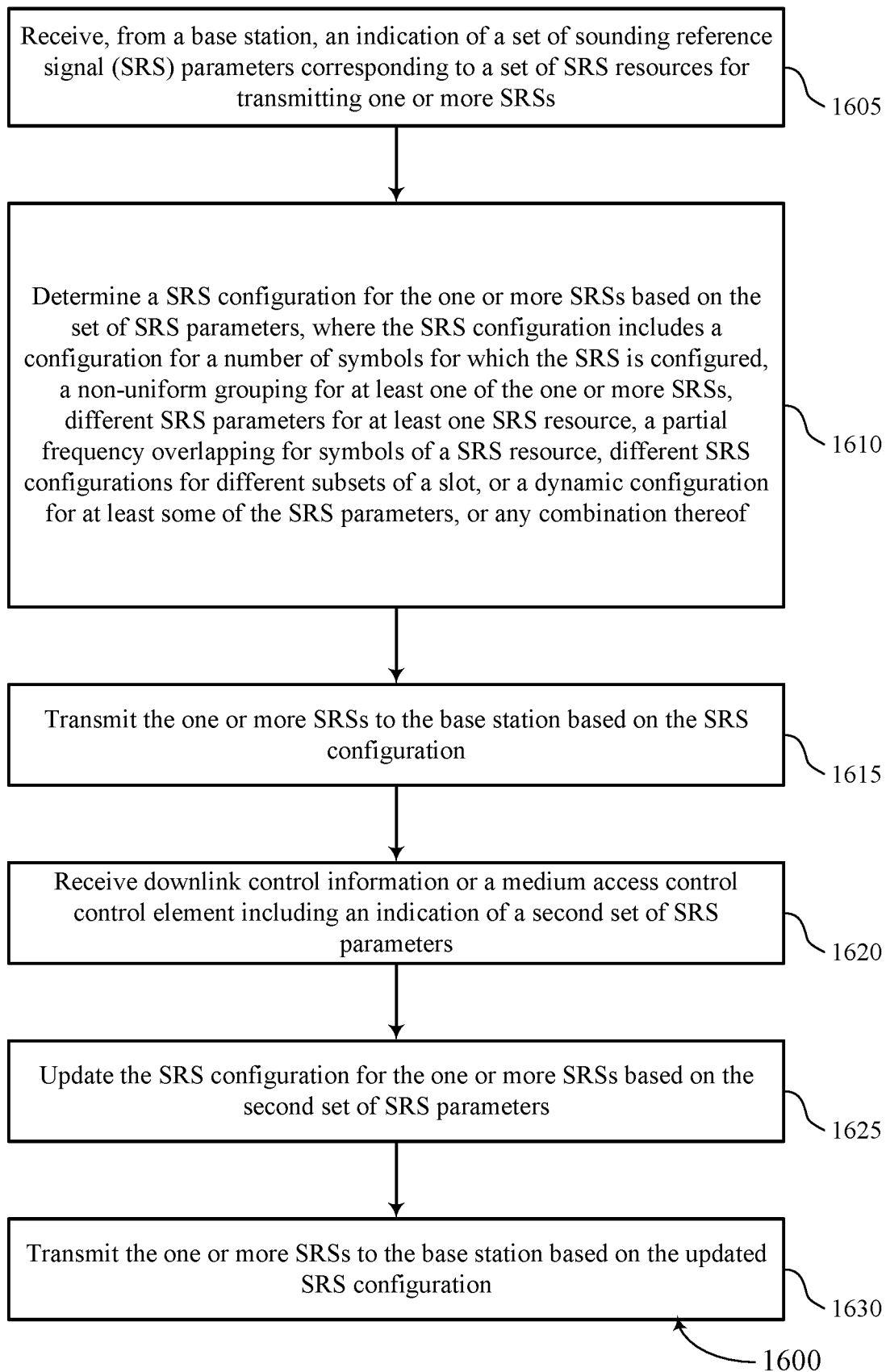

FIG. 16 shows a flowchart illustrating a method 1600 that supports enhanced SRS resource configurations in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, an indication of a set of SRS parameters corresponding to a set of SRS resources for transmitting one or more SRSs. The operations of 1605 may be performed according to the methods described herein. In some examples, aspects of the operations of 1605 may be performed by an SRS parameter component as described with reference to FIGS. 7 through 10.

At 1610, the UE may determine an SRS configuration for the one or more SRSs based on the set of SRS parameters, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The operations of 1610 may be performed according to the methods described herein. In some examples, aspects of the operations of 1610 may be performed by an SRS configuration component as described with reference to FIGS. 7 through 10.

At 1615, the UE may transmit the one or more SRSs to the base station based on the SRS configuration. The operations of 1615 may be performed according to the methods described herein. In some examples, aspects of the operations of 1615 may be performed by an SRS transmission component as described with reference to FIGS. 7 through 10.

At 1620, the UE may receive DCI or a MAC-CE including an indication of a second set of SRS parameters. The operations of 1620 may be performed according to the methods described herein. In some examples, aspects of the operations of 1620 may be performed by a DCI component as described with reference to FIGS. 7 through 10.

At 1625, the UE may update the SRS configuration for the one or more SRSs based on the second set of SRS parameters. The operations of 1625 may be performed according to the methods described herein. In some examples, aspects of the operations of 1625 may be performed by an SRS configuration component as described with reference to FIGS. 7 through 10.

At 1630, the UE may transmit the one or more SRSs to the base station based on the updated SRS configuration. The operations of 1630 may be performed according to the methods described herein. In some examples, aspects of the operations of 1630 may be performed by an SRS transmission component as described with reference to FIGS. 7 through 10.

Figure 17:
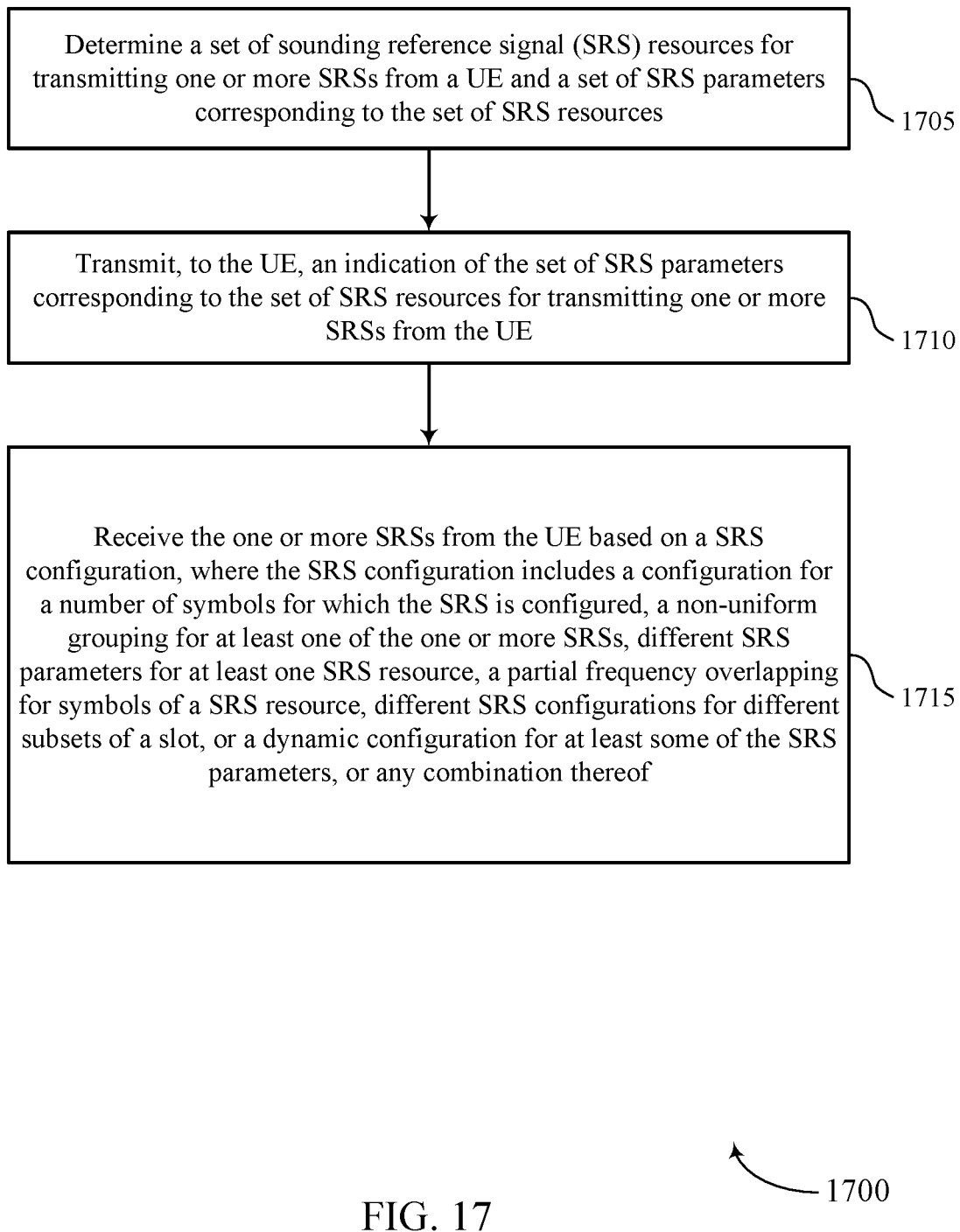

FIG. 17 shows a flowchart illustrating a method 1700 that supports enhanced SRS resource configurations in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may determine a set of SRS resources for transmitting one or more SRSs from a UE and a set of SRS parameters corresponding to the set of SRS resources. The operations of 1705 may be performed according to the methods described herein. In some examples, aspects of the operations of 1705 may be performed by an SRS resource manager as described with reference to FIGS. 11 through 14.

At 1710, the base station may transmit, to the UE, an indication of the set of SRS parameters corresponding to the set of SRS resources for transmitting one or more SRSs from the UE. The operations of 1710 may be performed according to the methods described herein. In some examples, aspects of the operations of 1710 may be performed by an SRS parameter manager as described with reference to FIGS. 11 through 14.

At 1715, the base station may receive the one or more SRSs from the UE based on an SRS configuration, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The operations of 1715 may be performed according to the methods described herein. In some examples, aspects of the operations of 1715 may be performed by an SRS reception manager as described with reference to FIGS. 11 through 14.

Figure 18:
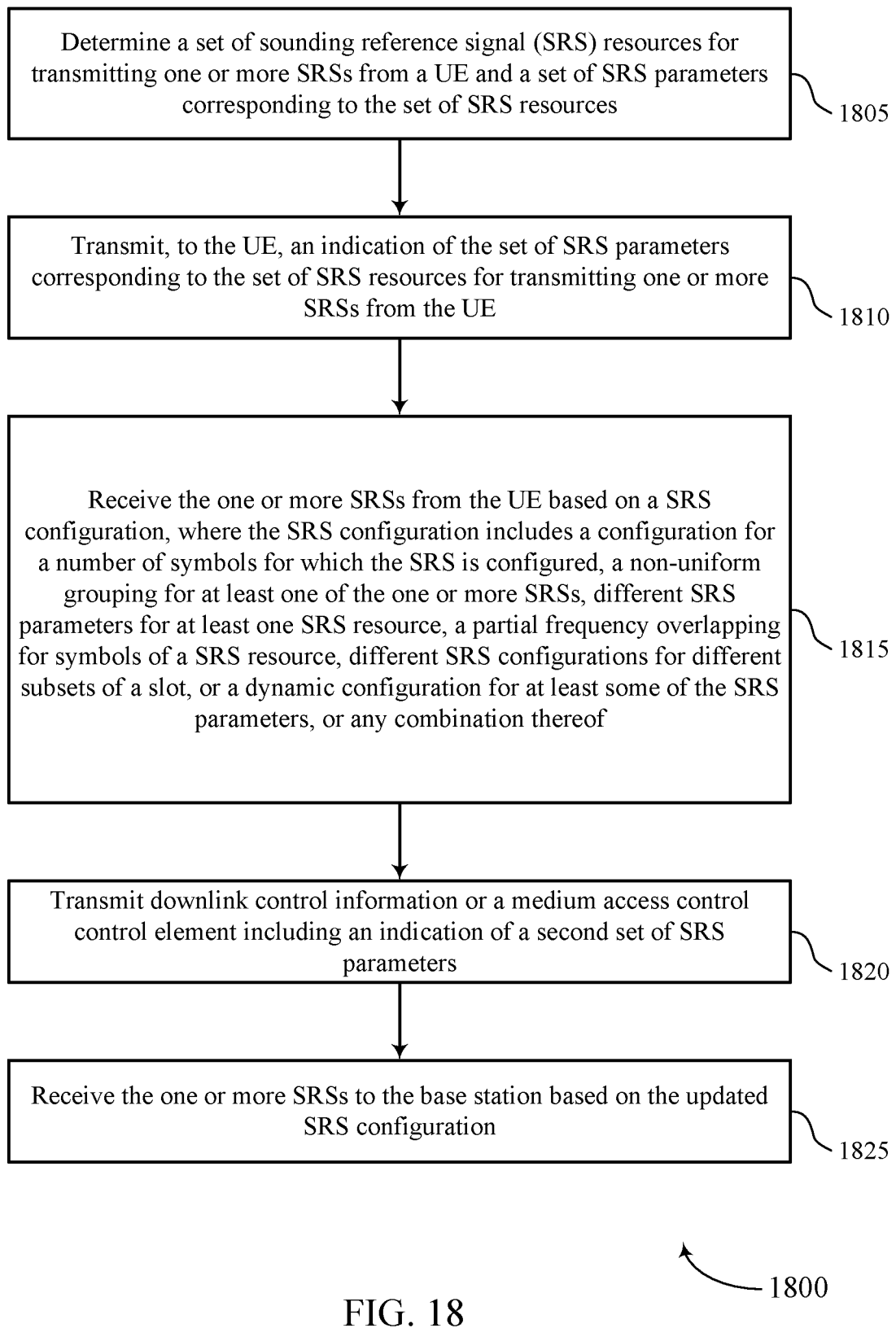

FIG. 18 shows a flowchart illustrating a method 1800 that supports enhanced SRS resource configurations in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may determine a set of SRS resources for transmitting one or more SRSs from a UE and a set of SRS parameters corresponding to the set of SRS resources. The operations of 1805 may be performed according to the methods described herein. In some examples, aspects of the operations of 1805 may be performed by an SRS resource manager as described with reference to FIGS. 11 through 14.

At 1810, the base station may transmit, to the UE, an indication of the set of SRS parameters corresponding to the set of SRS resources for transmitting one or more SRSs from the UE. The operations of 1810 may be performed according to the methods described herein. In some examples, aspects of the operations of 1810 may be performed by an SRS parameter manager as described with reference to FIGS. 11 through 14.

At 1815, the base station may receive the one or more SRSs from the UE based on an SRS configuration, where the SRS configuration may include a configuration for a number of symbols for which the SRS may be configured, a non-uniform grouping for at least one of the one or more SRSs, different SRS parameters for at least one SRS resource, a partial frequency overlapping for symbols of an SRS resource, different SRS configurations for different subsets of a slot, or a dynamic configuration for at least some of the SRS parameters, or any combination thereof. The operations of 1815 may be performed according to the methods described herein. In some examples, aspects of the operations of 1815 may be performed by an SRS reception manager as described with reference to FIGS. 11 through 14.

At 1820, the base station may transmit DCI or a MAC-CE including an indication of a second set of SRS parameters. The operations of 1820 may be performed according to the methods described herein. In some examples, aspects of the operations of 1820 may be performed by a DCI manager as described with reference to FIGS. 11 through 14.

At 1825, the base station may receive the one or more SRSs to the base station based on the updated SRS configuration. The operations of 1825 may be performed according to the methods described herein. In some examples, aspects of the operations of 1825 may be performed by an SRS reception manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by an apparatus, the method comprising:
   receiving an indication of a set of sounding reference signal parameters corresponding to a set of sounding reference signal resources for transmission of one or more sounding reference signals;
   determining a sounding reference signal configuration for the one or more sounding reference signals based at least in part on the set of sounding reference signal parameters, wherein the sounding reference signal configuration comprises a configuration for a number of symbols for which the one or more sounding reference signals are configured, a non-uniform grouping for at least one of the one or more sounding reference signals, different sounding reference signal parameters for at least one sounding reference signal resource, a partial frequency overlapping for symbols of a sounding reference signal resource, different sounding reference signal configurations for different subsets of a slot, or a dynamic configuration for at least some of the sounding reference signal parameters, or any combination thereof; and transmitting the one or more sounding reference signals based at least in part on the sounding reference signal configuration, wherein the number of symbols is ten symbols or fourteen symbols.

2. The method of claim 1, wherein receiving the indication of the set of sounding reference signal parameters comprises:
receiving an indication of the number of symbols for which the one or more sounding reference signals are configured, the number of symbols being the ten symbols.

3. The method of claim 1, wherein receiving the indication of the set of sounding reference signal parameters comprises:
receiving an indication of the number of symbols for which the one or more sounding reference signals are configured, the number of symbols being the fourteen symbols.

4. The method of claim 1, wherein determining the sounding reference signal configuration comprises:
determining that each of one or more antenna ports for the sounding reference signal resource is mapped to a single set of subcarriers across one or more pairs of the symbols of the sounding reference signal resource.

5. The method of claim 4, further comprising:
determining that the sounding reference signal configuration is unsupported based at least in part on determining that each of the one or more antenna ports of for the sounding reference signal resource is mapped to the single set of subcarriers across the one or more pairs of the symbols of the sounding reference signal resource, wherein transmitting the one or more sounding reference signals is based at least in part on determining that the sounding reference signal configuration is unsupported.

6. The method of claim 4, wherein determining the sounding reference signal configuration comprises:
determining the non-uniform grouping for the one or more sounding reference signals based at least in part on determining that each of the one or more antenna ports of for the sounding reference signal resource is mapped to the single set of subcarriers across the one or more pairs of the symbols of the sounding reference signal resource, wherein transmitting the one or more sounding reference signals is based at least in part on determining the non-uniform grouping for the one or more sounding reference signals.

7. The method of claim 1, wherein receiving the indication of the set of sounding reference signal parameters comprises:
receiving an indication of the non-uniform grouping for the one or more sounding reference signals for a sounding reference signal resource of the set of sounding reference signal resources or of a second set of sounding reference signal resources, and wherein determining the sounding reference signal configuration comprises; and
determining the non-uniform grouping for the one or more sounding reference signals based at least in part on receiving the indication of the non-uniform grouping.

8. The method of claim 7, wherein determining the non-uniform grouping comprises:
determining that the one or more sounding reference signals are each mapped to a different set of subcarriers across different symbols of the sounding reference signal resource.

9. The method of claim 8, wherein determining the non-uniform grouping comprises:
determining that one of the one or more sounding reference signals is to be repeated on a same set of subcarriers across contiguous symbols of the sounding reference signal resource; and
determining that one of the one or more sounding reference signals is not to be repeated on a same set of subcarriers across contiguous symbols of the sounding reference signal resource.

10. The method of claim 8, wherein determining the non-uniform grouping comprises:
determining that one of the one or more sounding reference signals is to be transmitted on a first group of subcarriers on at least a first symbol of the sounding reference signal resource; and
determining that one of the one or more sounding reference signals is to be transmitted on a second group of subcarriers on at least a second symbol of the sounding reference signal resource.

11. The method of claim 1, wherein determining the sounding reference signal configuration comprises:
setting a number of frequency hops for at least one of the one or more sounding reference signals, or setting a number of symbols of each frequency hop for at least one of the one or more sounding reference signals, or both.

12. The method of claim 1, wherein receiving the indication of the set of sounding reference signal parameters comprises:
receiving an indication of a comb value for one or more symbols of a sounding reference signal resource of the set of sounding reference signal resources, and wherein determining the sounding reference signal configuration comprises; and
setting a first comb value for a first symbol of the one or more symbols of the sounding reference signal resource and setting a second comb value for a second symbol of the one or more symbols of the sounding reference signal resource.

13. The method of claim 1, wherein receiving the indication of the set of sounding reference signal parameters comprises:
receiving an indication of a cyclic shift value or a cyclic shift offset for one or more symbols of a sounding reference signal resource of the set of sounding reference signal resources, and wherein determining the sounding reference signal configuration comprises; and
setting a first cyclic shift value or a first cyclic shift offset for a first symbol of the one or more symbols of the sounding reference signal resource and setting a second cyclic shift value or a second cyclic shift offset for a second symbol of the one or more symbols of the sounding reference signal resource.

14. The method of claim 1, wherein receiving the indication of the set of sounding reference signal parameters comprises:
- receiving an indication of a comb offset value for one or more symbols of a sounding reference signal resource of the set of sounding reference signal resources, and wherein determining the sounding reference signal configuration comprises; and
- setting a first comb offset value for a first symbol of the one or more symbols of the sounding reference signal resource and setting a second comb offset value for a second symbol of the one or more symbols of the sounding reference signal resource.

15. The method of claim 1, wherein receiving the indication of the set of sounding reference signal parameters comprises:
- receiving an indication that partial frequency overlapping for symbols of a sounding reference signal resource of the set of sounding reference signal resources is configured, and wherein determining the sounding reference signal configuration comprises; and
- setting a first set of subcarriers for a first symbol of the set of sounding reference signal resources and a second set of subcarriers for a second symbol of the set of sounding reference signal resources, the first set of subcarriers at least partially overlapping with the second set of subcarriers.

16. The method of claim 15, wherein determining the sounding reference signal configuration comprises:
- setting a third set of subcarriers for a third symbol of the set of sounding reference signal resources, the third set of subcarriers at least partially overlapping with the second set of subcarriers a same amount as the first set of subcarriers at least partially overlap with the second set of subcarriers.

17. The method of claim 15, wherein determining the sounding reference signal configuration comprises:
- setting a third set of subcarriers for a third symbol of the set of sounding reference signal resources, the third set of subcarriers at least partially overlapping with the second set of subcarriers a different amount as the first set of subcarriers at least partially overlap with the second set of subcarriers.

18. The method of claim 15, wherein determining the sounding reference signal configuration comprises:
- setting a third set of subcarriers for a third symbol of the set of sounding reference signal resources and a fourth set of subcarriers for a fourth symbol of the set of sounding reference signal resources, the fourth set of subcarriers at least partially overlapping with the third set of subcarriers a same amount as the first set of subcarriers at least partially overlap with the second set of subcarriers.

19. The method of claim 15, wherein determining the sounding reference signal configuration comprises:
- setting a third set of subcarriers for a third symbol of the set of sounding reference signal resources and a fourth set of subcarriers for a fourth symbol of the set of sounding reference signal resources, the fourth set of subcarriers at least partially overlapping with the third set of subcarriers a different amount as the first set of subcarriers at least partially overlap with the second set of subcarriers.

20. The method of claim 15, wherein determining the sounding reference signal configuration comprises:
- setting a third set of subcarriers for a third symbol of the set of sounding reference signal resources and a fourth set of subcarriers for a fourth symbol of the set of sounding reference signal resources, the fourth set of subcarriers not overlapping with the third set of subcarriers.

21. The method of claim 1, wherein determining the sounding reference signal configuration comprises:
- determining a first sounding reference signal configuration for a first subset of a slot and determining a second sounding reference signal configuration for a subset of the slot, and wherein the sounding reference signals comprise one or more of a periodic sounding reference signal or a semi-persistent sounding reference signal.

22. The method of claim 21, wherein determining the first sounding reference signal configuration and the second sounding reference signal configuration comprises:
- determining one or more sounding reference signal parameters of the set of sounding reference signal parameters for the first sounding reference signal configuration that are different than one or more sounding reference signal parameters of the set of sounding reference signal parameters for the second sounding reference signal configuration based at least in part on a frame index, a slot index, a periodic timing, a defined order, or any combination thereof.

23. The method of claim 21, wherein the sounding reference signal configuration comprises a configuration for the periodic sounding reference signal or the semi-persistent sounding reference signal.

24. The method of claim 1, wherein the set of sounding reference signal parameters comprises a frequency allocation, a comb value, a cyclic shift, a cyclic shift offset, a comb offset, a frequency hopping parameter, a repetition parameter, a symbol grouping parameter, or any combination thereof.

25. The method of claim 1, wherein receiving the indication of the set of sounding reference signal parameters comprises:
- receiving an indication of a symbol grouping parameter indicating one or more of a number of frequency hops or a number of symbols per frequency hop for the sounding reference signal configuration.

26. The method of claim 1, wherein receiving the indication of the set of sounding reference signal parameters further comprises:
- receiving radio resource control signaling comprising the indication of the set of sounding reference signal parameters.

27. The method of claim 1, wherein receiving the indication of the set of sounding reference signal parameters further comprises:
- receiving downlink control information or a medium access control control element comprising the indication of the set of sounding reference signal parameters.

28. The method of claim 27, wherein determining the sounding reference signal configuration comprises:
- selecting a defined configuration based at least in part on receiving the downlink control information or the medium access control control element; or
- setting one or more sounding reference signal parameters of the set of sounding reference signal parameters for the sounding reference signal configuration based at least in part on receiving the downlink control information or the medium access control control element.

29. The method of claim 1, further comprising:
receiving downlink control information or a medium access control control element comprising an indication of a second set of sounding reference signal parameters;
updating the sounding reference signal configuration for the one or more sounding reference signals based at least in part on the second set of sounding reference signal parameters; and
transmitting the one or more sounding reference signals based at least in part on the updated sounding reference signal configuration.

30. An apparatus for wireless communication, the apparatus comprising:
a processor; and
memory coupled with the processor, wherein the processor is configured to cause the apparatus to:
receive an indication of a set of sounding reference signal parameters corresponding to a set of sounding reference signal resources for transmission of one or more sounding reference signals;
determine a sounding reference signal configuration for the one or more sounding reference signals based at least in part on the set of sounding reference signal parameters, wherein the sounding reference signal configuration comprises a configuration for a number of symbols for which the one or more sounding reference signals are configured, a non-uniform grouping for at least one of the one or more sounding reference signals, different sounding reference signal parameters for at least one sounding reference signal resource, a partial frequency overlapping for symbols of a sounding reference signal resource, different sounding reference signal configurations for different subsets of a slot, or a dynamic configuration for at least some of the sounding reference signal parameters, or any combination thereof; and
transmit the one or more sounding reference signals based at least in part on the sounding reference signal configuration, wherein the number of symbols is ten symbols or fourteen symbols.

31. The apparatus of claim 30, wherein, to receive the indication of the set of sounding reference signal parameters, the processor is configured to cause the apparatus to:
receive an indication of the number of symbols for which the one or more sounding reference signals are configured, the number of symbols being the ten symbols.

32. The apparatus of claim 30, wherein, to receive the indication of the set of sounding reference signal parameters, the processor is configured to cause the apparatus to:
receive an indication of the number of symbols for which the one or more sounding reference signals are configured, the number of symbols being the fourteen symbols.

33. An apparatus comprising:
a processor; and
memory coupled with the processor, wherein the processor is configured to cause the apparatus to:
receive an indication of a set of sounding reference signal parameters corresponding to a set of sounding reference signal resources for transmission of one or more sounding reference signals, wherein the set of sounding reference signal parameters comprises a number of symbols for the one or more sounding reference signals, and wherein the number of symbols is ten symbols or fourteen symbols; and
transmit the one or more sounding reference signals based at least in part on the set of sounding reference signal parameters.

34. The apparatus of claim 33, wherein the number of symbols is the ten symbols.

35. The apparatus of claim 33, wherein the number of symbols is the fourteen symbols.

36. A method of wireless communication performed by an apparatus, the method comprising:
receiving an indication of a set of sounding reference signal parameters corresponding to a set of sounding reference signal resources for transmission of one or more sounding reference signals, wherein the set of sounding reference signal parameters comprises a number of symbols for the one or more sounding reference signals, and wherein the number of symbols is ten symbols or fourteen symbols; and
transmitting the one or more sounding reference signals based at least in part on the set of sounding reference signal parameters.

37. The method of claim 36, wherein the number of symbols is the ten symbols.

38. The apparatus of claim 36, wherein the number of symbols is the fourteen symbols.

39. A base station comprising:
a processor; and
memory coupled with the processor, wherein the processor is configured to cause the base station to:
transmit an indication of a set of sounding reference signal parameters corresponding to a set of sounding reference signal resources for transmission of one or more sounding reference signals, wherein the set of sounding reference signal parameters comprises a number of symbols for the one or more sounding reference signals, and wherein the number of symbols is ten symbols or fourteen symbols; and
receive the one or more sounding reference signals based at least in part on the set of sounding reference signal parameters.

40. The base station of claim 39, wherein the number of symbols is the ten symbols.

41. The base station of claim 39, wherein the number of symbols is the fourteen symbols.

42. An apparatus comprising:
a processor; and
memory coupled with the processor, wherein the processor is configured to cause the apparatus to:
receive an indication of a set of sounding reference signal parameters corresponding to a set of sounding reference signal resources for transmission of one or more sounding reference signals, wherein the set of sounding reference signal parameters comprises a number of symbols for the one or more sounding reference signals, wherein the number of symbols is ten symbols or fourteen symbols, and wherein the number of symbols is an integer multiple of a configured number of repetitions for the one or more sounding reference signals; and
transmit the one or more sounding reference signals based at least in part on the set of sounding reference signal parameters.

43. The apparatus of claim 42, wherein the number of symbols is the ten symbols.

44. The apparatus of claim 43, wherein the configured number of repetitions is one, two, or ten.

45. The apparatus of claim 42, wherein the number of symbols is the fourteen symbols.

46. The apparatus of claim 45, wherein the configured number of repetitions is one, two, or fourteen.

47. An apparatus comprising:
a processor; and
memory coupled with the processor, wherein the processor is configured to cause the apparatus to:
receive a set of sounding reference signal parameters for transmission of a sounding reference signal resource, wherein the set of sounding reference signal parameters comprises a number of symbols for the sounding reference signal resource and a number of repetitions for the sounding reference signal resource, wherein the number of symbols is ten symbols or fourteen symbols, and wherein the number of symbols is an integer multiple of the number of repetitions; and
transmit the sounding reference signal resource based at least in part on the set of sounding reference signal parameters.

48. The apparatus of claim 47, wherein the number of symbols is the ten symbols.

49. The apparatus of claim 48, wherein the number of repetitions is one, two, or ten.

50. The apparatus of claim 47, wherein the number of symbols is the fourteen symbols.

51. The apparatus of claim 50, wherein the number of repetitions is one, two, or fourteen.

* * * * *